US006832183B1

(12) United States Patent
Barich et al.

(10) Patent No.: US 6,832,183 B1
(45) Date of Patent: Dec. 14, 2004

(54) METHOD AND DATABASE ARRANGEMENT FOR INSPECTION AND REQUALIFICATION OF VEHICLES USED FOR TRANSPORTING COMMODITIES AND/OR HAZARDOUS MATERIALS

(75) Inventors: Daniel M. Barich, Frankfort, IL (US); Timothy Donahue, Wheaton, IL (US); Arthur J. Kozlowski, Oak Forest, IL (US)

(73) Assignee: General Electric Railcar Services Corporation, Chicago, IL (US)

( * ) Notice: Subject to any disclaimer, the term of this patent is extended or adjusted under 35 U.S.C. 154(b) by 677 days.

(21) Appl. No.: 09/676,752

(22) Filed: Oct. 2, 2000

Related U.S. Application Data

(60) Provisional application No. 60/157,057, filed on Oct. 1, 1999.

(51) Int. Cl.[7] ................................................. G06F 9/45
(52) U.S. Cl. ................................. 703/22; 701/35; 705/8
(58) Field of Search ............................. 703/22; 705/8; 707/100; 701/29, 35

(56) References Cited

U.S. PATENT DOCUMENTS

| | | | |
|---|---|---|---|
| 4,247,757 A | 1/1981 | Crump, Jr. | |
| 4,368,644 A | 1/1983 | Wentzell et al. | |
| 4,490,833 A | 12/1984 | Inomata et al. | |
| 4,658,649 A | 4/1987 | Brook | |
| 5,008,661 A | 4/1991 | Raj | |
| 5,036,707 A | 8/1991 | Paciej et al. | |
| 5,256,966 A | 10/1993 | Edwards | |
| 5,559,692 A * | 9/1996 | Telingator et al. .............. | 705/8 |
| 5,619,423 A | 4/1997 | Scrantz | |
| 5,631,831 A | 5/1997 | Bird et al. | |
| 5,648,619 A | 7/1997 | Gustafsson et al. | |
| 5,717,595 A * | 2/1998 | Cherrington et al. .......... | 701/29 |
| 5,956,077 A | 9/1999 | Qureshi et al. | |
| 5,964,811 A | 10/1999 | Ishii et al. | |
| 6,052,631 A | 4/2000 | Busch et al. | |
| 6,070,111 A | 5/2000 | Takakura et al. | |
| 6,101,433 A | 8/2000 | Flicker, Jr. | |
| 6,222,463 B1 * | 4/2001 | Rai .............................. | 701/35 |
| 6,417,760 B1 * | 7/2002 | Mabuchi et al. ............. | 340/5.3 |

OTHER PUBLICATIONS

International Search Report dated Jan. 8, 2001.
International Search Report dated Jan. 29, 2001.
Appendix B to DOT–E 12095 "Alternative Tank Car Qualification Program", pp. 1–12.
Appendix R, AAR Manual of Standards of Recommended Practices, Specifications for Tank Cars, pp. 319–331.
AAR Memo dated Apr. 5, 1999, Casualty Prevention Circular, "New Requirements for Inspections of Stub Sills on Tank Cars", CPC–1094.

(List continued on next page.)

*Primary Examiner*—Albert W. Paladini
(74) *Attorney, Agent, or Firm*—McDermott Will & Emery LLP

(57) ABSTRACT

A method of requalifying a rail born tank car adapted to transport includes inspecting the tank car in accord with a selected one of a plurality of procedures, each procedure delineating and defining a pre-determined plurality of inspections and test. Inspection data obtained from the predetermined series of steps and tests is input into a computer-readable storage medium, where it is related by a computer having at least one processor, to secondary data, such as ownership data, lease status data, rental status data, and/or transported commodity data. Based on this relation, the computer computes a requalification date for the tank car based on the input inspection data and the secondary data. This requalification date is output to at least one of a computer-readable storage medium, a display device, and a physical print media inclusive of an outer surface of the tank car.

20 Claims, 30 Drawing Sheets

OTHER PUBLICATIONS

AAR Memo dated Nov. 15, 1999, Casualty Prevention Circular, "Inspections of Stub Sills on Tank Cars–Availability of SILSPEC3 Software and Correction to Form SS–3", CPC–1100.

AAR Memo dated Aug. 10, 1994, O&M Circular No. 1, Supplement No. 2, "Tank Car Stub Sill Inspection Program", CPC–1030.

AAR Memo dated Jun. 10, 1995, O&M Circular No. 1, Supplement No. 1, Supplement No. 3, Tank Car Stub Sill Inspection Program, CPC–1047.

AAR Memo dated Oct. 18, 1996, Casualty Prevention Circular, "Tank Cars Manufactured to the RIC–RIC Stub Still Design", CPC–1070.

AAR Memo dated Dec. 5, 1996, Casualty Prevention Circular, "Tank Cars Manufactured to the RIC–RIC Stub Still Design", CPC–1072.

AAR Memo dated Jun. 6, 1997, Casulty Prevention Circular, Requirements for Tank Car Owners to Perform Stub Still Damage Tolerance Analyses, CPC–1082.

EO–17, FRA Order No. 17, Notices 1 and 2, "Owners of Railroad Tank Cars" AAR Memo dated Jul. 17, 1992, O&M Circular No. 1, "Tank Car Stub Still Inspection Program".

49 Code of Federal Regulations, Subpart F Sec. 180.500–509.

49 Code of Federal Regulations, Sec. 179.100–6, 179.101–1, 179.7(d).

Rule 88—Interchange of Freight Cars, "Mechanical Requirements For Acceptance", pp. 518–532.

AAR Memo dated Sep. 7, 1999, Casualty Prevention Circular, "New Requirements for Inspections of Stub Sills on Tank Cars", CPC–1097.

* cited by examiner

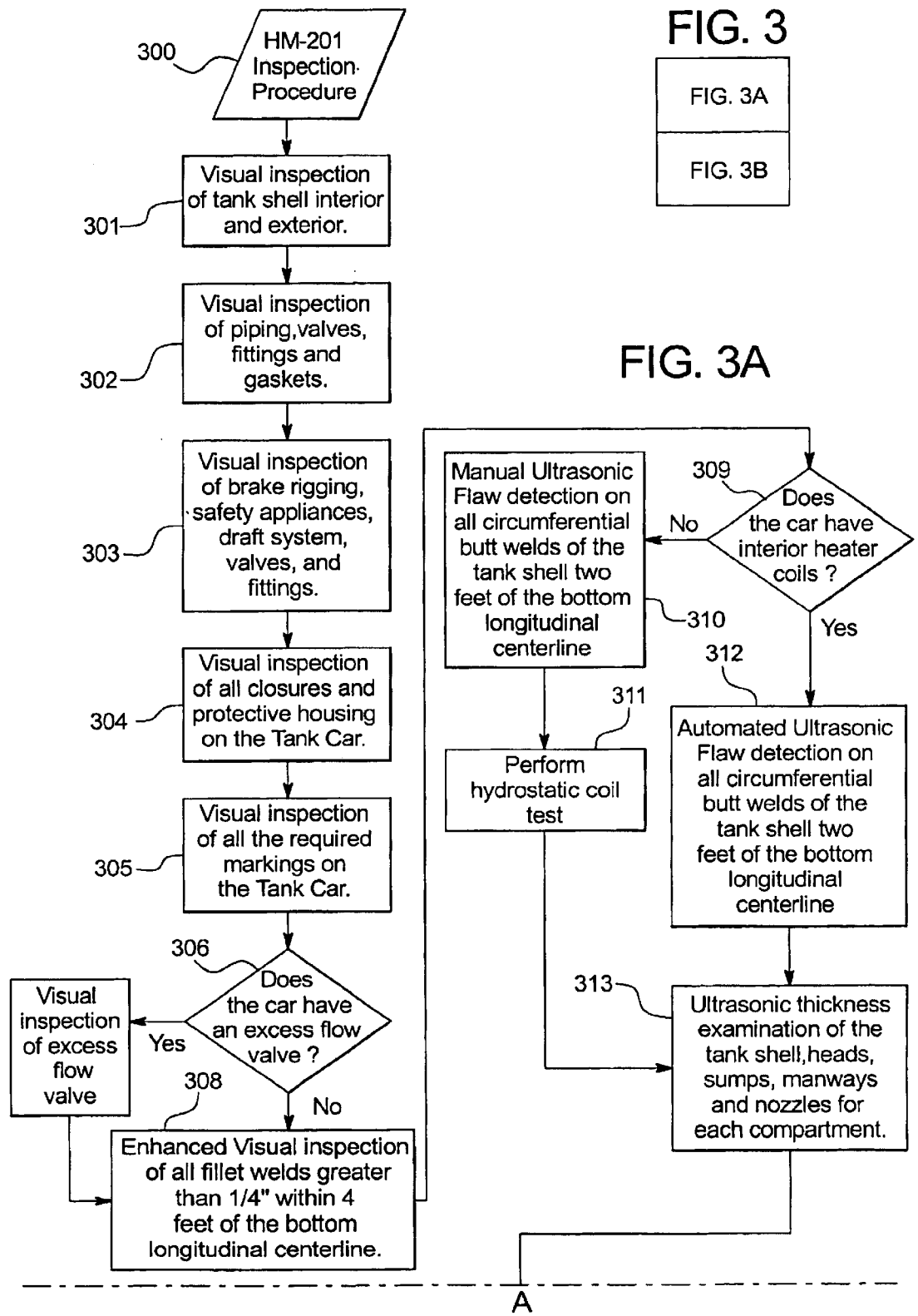

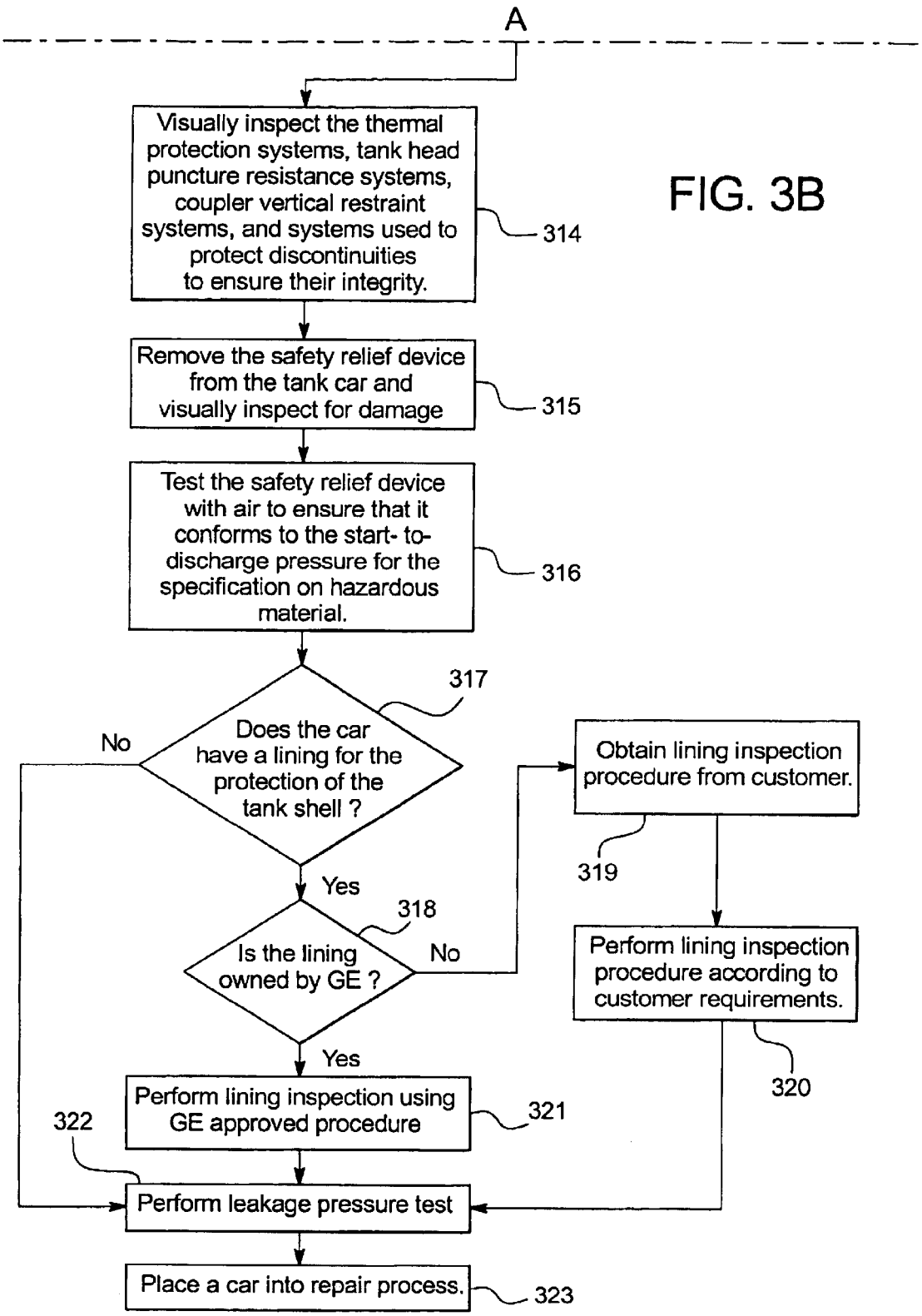

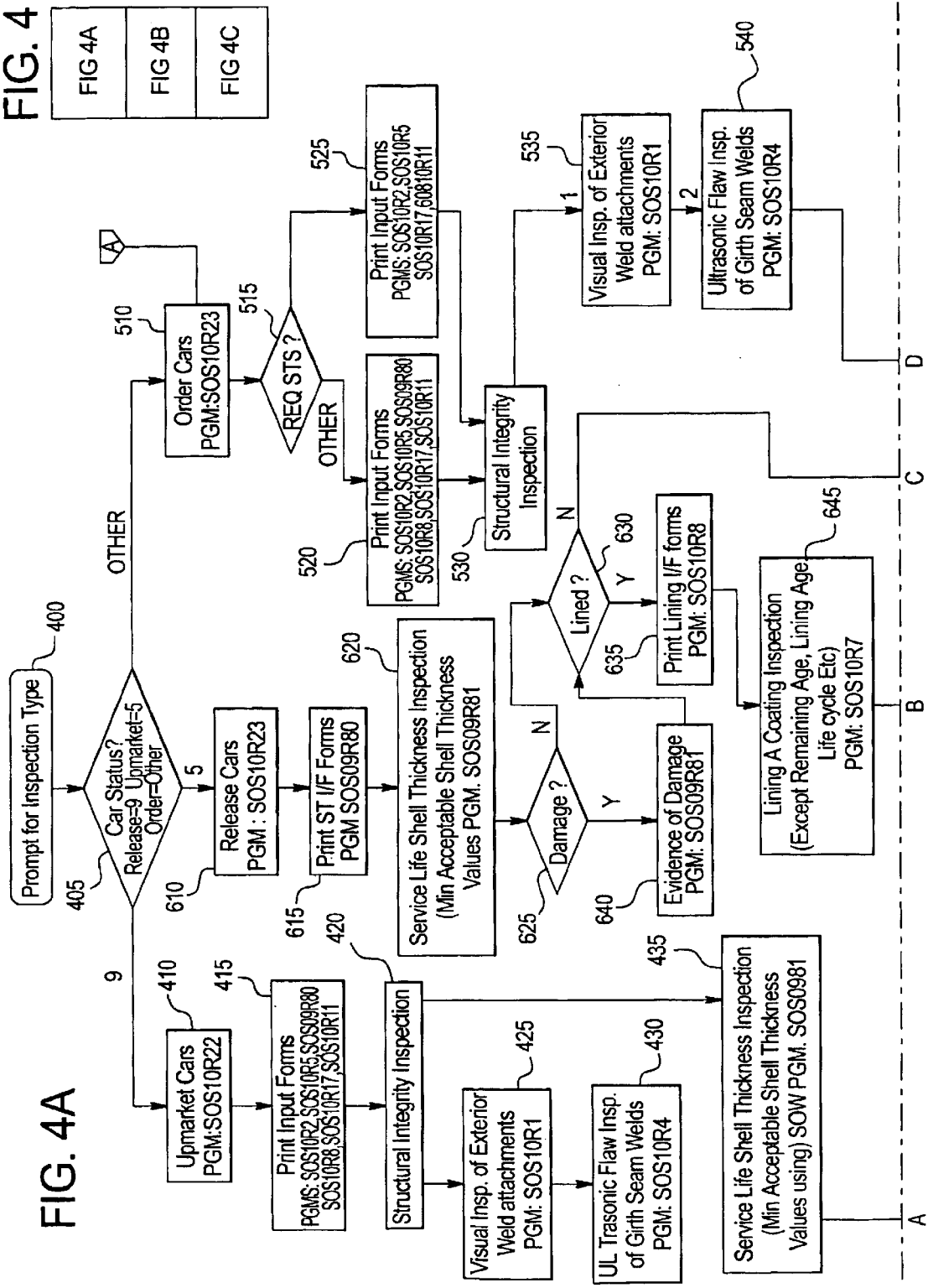

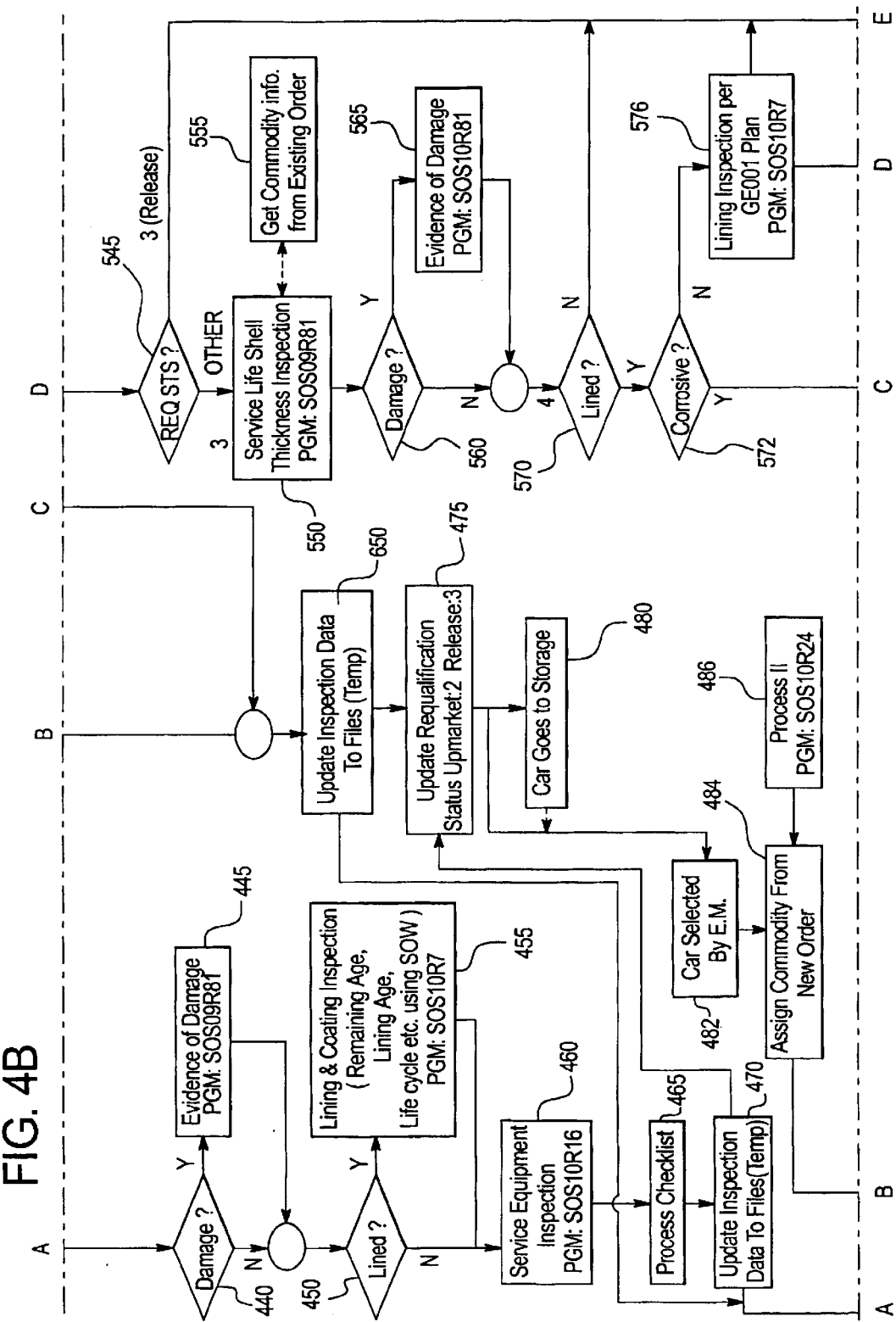

9      Tank Shell Attachment Weld Defect Report    FIG 5

| CAR INFORMATION | SHOP INFORMATION |
|---|---|
| Car Mark _____ | Shop Name _____ |
| Car Owner _____ | Shop City & State _____ |
| DOT Specification _____ | Date of Inspection _____ |
| Car Builder _____ | Next Rule 88b2 Date: _____ |
| Stub Sill Design _____ | Next Stub Sill Date: _____ |
| Signature of Inspector: _____ | |

Tank Shell Weld Attachment Defect Data

| Car Location | Weld Code | Defect Length | Defect Code | Repair Procedure |
|---|---|---|---|---|
| ARO | A9 | 3" | WTT | Section CIII, Appendix R paragraph 11.05 (example only) |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

Procedure Used: _____

Equipment Used: _____

Inspector Name: _____    Level of Certification: _____ (I, II, III)

Inspection Date: _____

Surface from which the examination was conducted: _____

Calibration Sheet for Log reference: _____

Couplant Manufacturer and Type: _____

Calibration Block Identification: _____

Condition of the Surface of the Material: _____

Special equipment used, if applicable: _____

Revised 1/11/2000                                     *GE Capital Rail Services*
Rev. C _____                                                 Doc. No: WLD-REP1

9 Tank Shell Girth Weld Defect Report FIG 6

CAR INFORMATION
Car Mark
Car Owner
DOT Specification
Car Builder
Stub Sill Design
Signature of Inspector:

SHOP INFORMATION
Shop Name
Shop City & State
Date of Inspection

Tank Shell Girth Weld Defect Data

| Car Location | Weld Code | Defect Length | Defect Code | Repair Procedure |
|---|---|---|---|---|
| ARO | A9 | 3" | WTT | Section CIII, Appendix R paragraph 1.F.05 (example only) |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |

Procedure Used:
Equipment Used:
Inspector Name: _____ Level of Certification: _____ (I, II, III)
Inspection Date:
Surface from which the examination was conducted:
Calibration Sheet for Log reference:
Couplant Manufacturer and Type:
Calibration Block Identification:
Condition of the Surface of the Material:
Special equipment used, if applicable:

Revised 1/11/2000
Rev. C

*GE Capital Rail Services*
Doc. No: WLD-REP2

FIG 7

Ultrasonic Service Life Shell Thickness Report

CAR INFORMATION
Car Mark
Car Owner
DOT Specification
Car Builder
Stub Sill Design
Signature of Inspector:

SHOP INFORMATION
Shop Name
Shop City & State
Date of Inspection
Next Thickness Date:

| | Tank Car Clock Position | | | | |
|---|---|---|---|---|---|
| Head | 3:00 | 6:00 | 9:00 | 12:00 | Center |
| A End | | | | | |
| B End | | | | | |

| Ring Number | Tank Car Clock Positions | | | | | | | |
|---|---|---|---|---|---|---|---|---|
| | 3:00 | | 6:00 | | 9:00 | | 12:00 | |
| | A End | B End | A End | B End | A End | B End | A End | B End |
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |

| Local Openings | Location | A-End | B-End |
|---|---|---|---|
| Manway 1 | | | |
| Unload Nozzle 1 | | | |
| Safety Valve Nozzle 1 | | | |
| Sump 1 | | | |
| | | | |
| | | | |
| | | | |
| | | | |
| | | | |

Procedure Used:
Equipment Used:
Inspector Name: _____ Level of Certification: _____ (I, II, III)
Inspection Date:
Surface from which the examination was conducted:
Calibration Sheet for Log reference:
Couplant Manufacturer and Type:
Calibration Block Identification:
Condition of the Surface of the Material:
Special equipment used, if applicable:

Revised 1/11/2000
Rev. B

*GE Capital Rail Services*
Doc. No: EOD-REP

FIG 8

9           Ultrasonic Evidence of Damage Report

| CAR INFORMATION | | SHOP INFORMATION | |
|---|---|---|---|
| Car Mark | | Shop Name | |
| Car Owner | | Shop City & State | |
| DOT Specification | | Date of Inspection | |
| Car Builder | | Signature of Inspector: | |
| Stub Sill Design | | | |

| THICKNESS REQUIREMENTS | | TOP | BOTTOM |
|---|---|---|---|
| Minimum Acceptable Shell Thickness: | General | | |
| | Local | | |
| | Mechanical | | |
| Local Openings Maximum Acceptable Depth of the Pits: | | | |

| Head/Shell | Location | Clock/HD Position | Distance From B-End Weld | Diameter | Type of Damage | Cause of Damage | Concent. of Pits | Thk. Readings | |
|---|---|---|---|---|---|---|---|---|---|
| | | | | | | | | Before | After |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |

Type of Damage:    General, Local, Mechanical        Cause of Damage: Corrosion (random, grouped, general)
                                                                                                                         Mechanical (gouge, hammer marks)

Procedure Used:
Equipment Used:
Inspector Name:                                            Level of Certification:                          (I, II, III)
Inspection Date:
Surface from which the examination was conducted:
Calibration Sheet for Log reference:
Couplant Manufacturer and Type:
Calibration Block Identification:
Condition of the Surface of the Material:
Special equipment used, if applicable:

Revised 1/11/2000                                                                                                 *GE Capital Rail Services*
Rev. B                                                                                                             Doc. No: EOP-REP 9            Lining System Defect Report         FIG 9

| CAR INFORMATION | SHOP INFORMATION |
|---|---|
| Car Mark | Shop Name |
| Car Owner | Shop City & State |
| DOT Specification | Date of Inspection |
| Car Builder | Next Lining Date: |
| Stub Sill Design | Signature of Inspector: |

| LINING INFORMATION | |
|---|---|
| Purpose of Lining | |
| Lining Age (years) | |
| Extended Life Condition % (ELC) | |
| Lining Class | |
| Commodity Name | |
| Lining Inspection Plan | |
| Corrosive Commodity Category | |
| Lining Condition Code (E=Excellent; G=Good; F=Fair; P=Poor) | |

MANDATORY INSPECTIONS

| Defect | Condition | Type (or) Density | Repair Disposition | Location (General, Local) | Number of Areas (In Case of Local) |
|---|---|---|---|---|---|
| Blisters | | | | | |
| Cracks | | | | | |
| Corrosion | | | | | |

Dry Film Thickness:           Discoloration:
     Average Reading: _____      Total Square Footage: _____
     Lowest Reading: _____      Number of Areas: _____
     Highest Reading: _____

~~MANDATORY~~ OPTIONAL INSPECTIONS

Delamination:           Pin Holes:
     Condition: _____      Condition: _____
     Number of Areas: _____      Number of Areas: _____

Procedure Used: _____
Equipment Used: _____
Inspector Name: _____     Level of Certification: _____
Inspection Date: _____
Calibration Sheet for Log reference: _____
Condition of the Surface of the Material: _____
Special equipment used, if applicable: _____

Revised 1/11/2000           *GE Capital Rail Services*
Rev. A           Doc. No: LSD-REP 9             Tankcar Requalification Report          FIG 10

| CAR INFORMATION | SHOP INFORMATION |
|---|---|
| Car Mark | Shop Name |
| Car Owner | Shop City & State |
| DOT Specification | Date of Inspection |
| Car Builder | Next Tank Requalification Date: |
| Stub Sill Design | Next Thickness Date: |
| Signature of Inspector: | Next Service Equipment Date: |
| | Next PRD Date: |
| | Next Lining & Coating Date: |
| | Next Rule 88b2 Date: |
| | Next Stub Sill Date: |

1. GENERAL INSPECTION

Tank Shell and Head Inspection:

Visual Interior Inspection      ☐ Pass   ☐ Repaired Required   Repair Procedure: _____

Visual Exterior Inspection      ☐ N/A ☐ Pass   ☐ Repaired Required   Repair Procedure: _____

Visual Inspection of Piping, Valves, Fittings, & Gaskets:
     ☐ Pass   ☐ Repaired Required   Repair Procedure: _____

Visual Inspection of Missing or Loose Bolts, Nuts, & Elements:
     ☐ Pass   ☐ Repaired Required   Repair Procedure: _____

Visual Inspection of Tank Car Closures:
     ☐ Pass   ☐ Repaired Required   Repair Procedure: _____

Visual Inspection of Excess Flow Valve:
     ☐ N/A ☐ Pass   ☐ Repaired Required   Repair Procedure: _____

Visual Inspection of Required Markings on the Tank Car:
     ☐ Pass   ☐ Repaired Required   Repair Procedure: _____

2. STRUCTURAL INTEGRITY INSPECTION (See Attached Report)

Visual Inspection of Exterior Weld Attachments   ☐ Pass   ☐ Repaired Required   Repair Procedure: _____

Ultrasonic Flaw Inspection of Girth Seam Welds   ☐ Pass   ☐ Repaired Required   Repair Procedure: _____

3. SERVICE LIFE SHELL THICKNESS INSPECTION (See Attached Report)

Ultrasonic Thickness Inspection of Tank Shell   ☐ Pass   ☐ Repaired Required   Repair Procedure: _____

Evidence of Damage Inspection   ☐ Pass   ☐ Repaired Required   Repair Procedure: _____

4. SAFETY SYSTEM INSPECTION

☐ Pass   ☐ Repaired Required   Repair Procedure: _____

5. LEAKAGE PRESSURE TEST

Bubble Test Tank Shell & Service Equipment   ☐ Pass   ☐ Repaired Required   Repair Procedure: _____

Hydrostatically Test Interior Coils   ☐ N/A ☐ Pass   ☐ Repaired Required   Repair Procedure: _____

6. LINING & COATING INSPECTION (See Attached Report)

Visually Inspection Interior Lining   ☐ N/A ☐ Pass   ☐ Repaired Required   Repair Procedure: _____

Revised 1/11/2000                                                   *GE Capital Rail Services*
Rev. C _____                                                          Doc. No: REQ-REP

Figure 11a

TANK CAR WELD INSPECTION MATRIX

| COMPONENT | DEFECT CODE | CAR LOCATION | WELD CODE | WELD CODE DESCRIPTION | CAR BUILDER & STUB SILL DESIGN ||||||||||||
|---|---|---|---|---|---|---|---|---|---|---|---|---|---|---|---|---|
| | | | | | RJC-RJC RJC-WBR | NAC-DEF NAC-GHI | AMF-ABC AMF-JKL | EVA-EVA EVA-WBR | ACF-100 | ACF-200 ACF-270 | ACF-230 | UTL-ZBN | TRN-TY5 | TRN-021 | TRN-022 | TRN-023 |
| Head Brace Pad | PPM WTP WTH TPM OTH | A- & B-End | AH1 | Headpad extension transverse weld. | YES | YES | YES | YES | NO | NO | NO | NO | NO | NO | NO | NO |
| | | A- & B-End | AH2 | Headpad extension longitudinal weld. | YES | YES | YES | YES | NO | NO | NO | NO | NO | NO | NO | NO |
| Pad-to-Tank | PPM TPM WTP WTT OTH | A- & B-End | A1 | Front sill pad-to-tank transverse weld. | YES | YES[1] | YES | YES | NO | YES[3] | YES[2] | YES | YES | YES | YES | YES |
| | | AR, AL, BR, BL | A2 | Front sill pad longitudinal welds. | YES | YES | YES | YES | YES | YES | YES | YES | YES | YES | YES | YES |
| | | A- & B-End | A3 | Fillet weld in front sill pad-to-tank cutout. | YES | YES | NO | YES | NO | NO | NO | YES | YES | YES | YES | YES |
| | | AR, AL, BR, BL | A4 | Cradle pad longitudinal weld-outboard termination | YES | YES | NO | YES | NO | NO | NO | YES | YES | YES | YES | YES |
| | | A- & B-End | A5 | Front sill pad-to-bolster pad transverse weld. | YES | YES | NO | YES | NO | NO | NO | YES | YES | YES | YES | YES |
| | | AR, AL, BR, BL | A6 | Inboard termination of cradle longitudinal welds. | YES | YES | NO | YES | NO | YES | YES | YES | YES | YES | YES | YES |
| | | A- & B-End | A7 | Cradle pad-to-bolster pad transverse weld. | YES | YES | NO | YES | NO | NO | NO | NO | YES | YES | YES | YES |
| | | A- & B-End | A8 | Cradle pad-to-tank slot welds. | YES | YES | YES | YES | NO | YES | YES | YES | NO | YES | NO | NO |
| | | ARO, ARI, ALO, ALI, BRO, BRI, BLO, BLI | A9 | Bolster pad-to-tank transverse weld. | YES | YES | YES | | YES | YES | YES | YES | YES | YES | YES | YES |
| | | AR, AL, BR, BL | A13 | Sill top cover to cradle pad transverse welds. | NO | NO | YES | NO | NO | NO | NO | NO | NO | NO | NO | NO |

Figure 11b

TANK CAR WELD INSPECTION MATRIX

| COMPONENT | DEFECT CODE | CAR LOCATION | WELD CODE | WELD CODE DESCRIPTION | RJC-RJC RJC-WBR | NAC-DEF NAC-GHI | AMF-ABC AMF-JKL | EVA-EVA EVA-WBR | ACF-100 | ACF-200 ACF-270 | ACF-230 | UTL-ZBN | TRN-TY3 | TRN-021 | TRN-022 | TRN-023 |
|---|---|---|---|---|---|---|---|---|---|---|---|---|---|---|---|---|
| Pad-to-Tank (con't) | | AR, AL, BR, BL | A15 | Cradle pad-to-tank inboard transverse welds. | NO | NO | YES | NO | YES | NO | NO | NO | NO | NO | NO | NO |
| | | AR, AL, BR, BL | A24 | Termination of cradle pad longitudinal weld (inside of sill web). | NO | NO | YES | NO | NO | NO | NO | NO | NO | NO | NO | NO |
| | | AR, AL, BR, BL | A44 | Termination of re-bar to tank longitudinal weld (inside of re-bar). | NO | NO | NO | NO | NO | NO | NO | NO | YES | YES | YES | YES |
| | | AR, AL, BR, BL | A66 | Termination of re-bar to tank longitudinal weld (inside of re-bar and inboard of bolster) | NO | NO | NO | NO | NO | NO | NO | NO | YES | YES | YES | YES |
| | | AR, AL, BR, BL | A271 | Headpad-to-tank horizontal weld. | NO | NO | NO | NO | NO | YES (ACF-270 ONLY) | NO | NO | NO | NO | NO | NO |
| | | AR, AL, BR, BL | A273 | Headpad-to-tank vertical weld. | NO | NO | NO | NO | NO | YES (ACF-270 ONLY) | NO | NO | NO | NO | NO | NO |
| Sill-to-Pad | PPM SPM WTP WTS OTH | A- & B-End | B1 | Transverse weld (top of sill flange). | YES | YES | NO | YES | NO | NO | NO | NO | NO | NO | NO | NO |
| | | AR, AL, BR, BL | B2 | Outboard termination of longitudinal weld (outside of sill). | YES | YES | YES | YES | YES | YES | YES | YES | YES | YES | YES | YES |
| | | A- & B-End | B3 | Transverse weld (bottom of top sill flange). | YES | YES | NO | YES | NO | YES | YES | NO | NO | NO | NO | NO |
| | | AR, AL, BR, BL | B4 | Inboard termination of longitudinal weld (outside of sill). | YES | YES | YES | YES | YES | YES | YES | YES | YES | YES | YES | YES |

CAR BUILDER & STUB SILL DESIGN

Figure 11c

TANK CAR WELD INSPECTION MATRIX

| COMPONENT | CODE | CAR LOCATION | WELD CODE | WELD CODE DESCRIPTION | CAR BUILDER & STUB SILL DESIGN ||||||||||||
|---|---|---|---|---|---|---|---|---|---|---|---|---|---|---|---|
| | | | | | RJC-RJC RJC-WBR | NAC-DEF NAC-GHI | AMF-ABC AMF-JKL | EVA-EVA EVA-WBR | ACF-100 | ACF-200 ACF-270 | ACF-230 | UTL-ZBN | TRN-TY3 | TRN-021 | TRN-022 | TRN-023 |
| Sill-to-Pad (con't) | | AR, AL, BR, BL | B5 | Sill top flange to cradle pad inboard transverse weld. | NO | NO | NO | NO | NO | YES | YES | NO | NO | NO | NO | NO |
| | | A- & B-End | B6 | Sill top flange to cradle pad slot weld. | NO | NO | NO | NO | NO | YES | YES | NO | NO | NO | NO | NO |
| | | A- & B-End | B8 | Sill top flange to cradle pad inboard slot weld. | NO | NO | YES | NO | NO | NO | NO | NO | NO | NO | NO | NO |
| | | A- & B-End | B11 | Sill top cover-to-tank transverse weld (seal weld). | NO | YES | YES | YES | YES | YES | YES | YES | YES | YES | YES | YES |
| | | AR, AL, BR, BL | B22 | Outboard termination of longitudinal weld (inside of sill). | YES | YES | YES | YES | NO | YES | YES | YES | YES | YES | YES | YES |
| | | AR, AL, BR, BL | B44 | Inboard termination of longitudinal weld (inside of sill). | YES | YES | NO | NO | YES | NO | NO | NO | NO | NO | NO | NO |
| | | AR, AL, BR, BL | B104 | Inboard termination of sill web-to-sill bottom cover. | NO | NO | NO | NO | YES | NO | NO | NO | NO | NO | NO | NO |
| | | A- & B-End | B105 | Sill bottom flange to cradle pad transverse weld. | NO | NO | NO | NO | NO | NO | NO | NO | NO | NO | NO | NO |
| | | AR, AL, BR, BL | B106 | Inboard termination of sill bottom cover-top-cradle pad longitudinal weld. | NO | NO | NO | NO | NO | NO | YES | NO | NO | NO | NO | NO |
| | | AR, AL, BR, BL | B231 | U-brace-to-cradle pad U-shaped weld. | NO | NO | NO | NO | NO | NO | YES | NO | NO | NO | NO | NO |
| | | ARO, ARI, ALO, ALI, BRO, BRI, BLO, BLI | B233 | U-brace-to-sill vertical weld. | NO | NO | NO | NO | NO | NO | NO | NO | NO | NO | NO | NO |

*Figure 11d*

TANK CAR WELD INSPECTION MATRIX

| COMPON ENT | DEFECT CODE | CAR LOCATION | WELD CODE | WELD CODE DESCRIPTION | CAR BUILDER & STUB SILL DESIGN ||||||||||||
|---|---|---|---|---|---|---|---|---|---|---|---|---|---|---|---|
| | | | | | RJC-RJC RJC-WBR | NAC-DEF NAC-GHI | AMF-ABC AMF-JKL | EVA-EVA EVA-WBR | ACF-100 | ACF-200 ACF-270 | ACF-230 | UTL-ZBN | TRN-TY3 | TRN-021 | TRN-022 | TRN-023 |
| Sill-to-Pad (con't) | | AR, AL, BR, BL | B235 | U-brace-to-sill bottom flange U-shaped weld. | NO | NO | NO | NO | NO | NO | YES | NO | NO | NO | NO | NO |
| | | A- & B-End | B237 | Transverse backstop plate-to-cradle transverse weld. | NO | NO | NO | NO | NO | NO | YES | NO | NO | NO | NO | NO |
| | | AR, AL, BR, BL | B239 | Transverse backstop plate-to-longitudinal backstop weld. | NO | NO | NO | NO | NO | NO | YES | NO | NO | NO | NO | NO |
| | | A- & B-End | B241 | Transverse backstop plate-to-center filler bottom cover plate. | NO | NO | NO | NO | NO | NO | YES | NO | NO | NO | NO | NO |
| | | A- & B-End | B243 | Mini-bolster-to-pad-transverse weld. | NO | NO | NO | NO | NO | NO | YES | NO | NO | NO | NO | NO |
| | | A- & B-End | B245 | Mini-bolster-to-sill vertical weld. | NO | NO | NO | NO | NO | NO | YES | NO | NO | NO | NO | NO |
| Headbrace-to-Sill | HPM SPM WTH WTS OTH | A- & B-End | C1 | Headbrace-to-sill transverse weld. | YES | YES | YES | YES | NO | NO | NO | YES | YES | YES | YES | YES |
| | | AR, AL, BR, BL | C2 | Headbrace-to-sill longitudinal weld. | YES | YES | YES | YES | NO | NO | NO | YES | YES | YES | YES | YES |
| | | AR, AL, BR, BL | C271 | Angle-to-sill vertical weld | NO | NO | NO | NO | NO | YES | NO | NO | NO | NO | NO | NO |
| Headbrace-to-Pad | HPM PPM WTP WTH OTH | A- & B-End | D1 | Headbrace-to-pad transverse weld. | YES | YES | YES | YES | NO | NO | NO | YES | YES | YES | YES | YES |
| | | AR, AL, BR, BL | D2 | Headbrace-to-pad longitudinal weld. | YES | YES | YES | YES | NO | NO | NO | YES | YES | YES | YES | YES |
| | | AR, AL, BR, BL | D271 | Angle-to-pad U-shaped weld. | NO | NO | NO | NO | NO | YES | NO | NO | NO | NO | NO | NO |

*Figure 11e*

TANK CAR WELD INSPECTION MATRIX

| COMPONENT | DEFECT CODE | CAR LOCATION | WELD CODE | WELD CODE DESCRIPTION | CAR BUILDER & STUB SILL DESIGN ||||||||||||
|---|---|---|---|---|---|---|---|---|---|---|---|---|---|---|---|
| | | | | | RJC-RJC RJC-WBR | NAC-DEF NAC-GHI | AMF-ABC AMF-JKL | EVA-EVA EVA-WBR | ACF-100 | ACF-200 ACF-270 | ACF-230 | UTL-ZBN | TRN-TY3 | TRN-021 | TRN-022 | TRN-023 |
| Bolster-to-Bolster Pad | BWPM BCPM PPM SPM BPPM SCPM BBPM | AR, AL, BR, BL | SB1 | Bolster web, bolster pad, and stiffener welds inboard of bolster from the outside edge of side bearing pad to draft sill. | YES | YES | YES | YES | YES | YES | YES | YES | YES | YES | YES | YES |
| | WBTP WBTS WBBC WBSC WBSW OTH | AR, AL, BR, BL | OSB | Bolster web, bolster pad, and stiffener welds outboard of bolster from the outside edge of the side bearing pad to side cover plate. | YES | YES | YES | YES | YES | YES | YES | YES | YES | YES | YES | YES |
| | | AR, AL, BR, BL | E2 | Bolster bottom cover plate to sill flange, longitudinal weld. | YES | YES | YES | YES | YES | YES | YES | YES | YES | YES | YES | YES |
| BOV Saddle-to-Tank | TMP SPM WTT WTS OTH | N/A | G1 | Single compartment cars only. Transverse portions of BOV saddle weld. | YES | YES | YES | YES | YES | YES | YES | YES | YES | YES | YES | YES |
| | | N/A | G1a | Two compartment cars only. Transverse portions of BOV saddle weld. | YES | YES | YES | YES | YES | YES | YES | YES | YES | YES | YES | YES |
| | | N/A | G1b | Three compartment cars only. Transverse portions of BOV saddle weld. | YES | YES | YES | YES | YES | YES | YES | YES | YES | YES | YES | YES |

Figure 11f

TANK CAR WELD INSPECTION MATRIX

| COMPONENT | DEFECT CODE | CAR LOCATION | WELD CODE | WELD CODE DESCRIPTION | CAR BUILDER & STUB SILL DESIGN |||||||||||||
|---|---|---|---|---|---|---|---|---|---|---|---|---|---|---|---|---|
| | | | | | RJC-RJC RJC-WBR | NAC-DEF NAC-GHI | AMF-ABC AMF-JKL | EVA-EVA EVA-WBR | ACF-100 | ACF-200 ACF-270 | ACF-230 | UTL-ZBN | TRN-TY3 | TRN-021 | TRN-022 | TRN-023 |
| BOV Saddle-to-Tank (con't) | | N/A | G1c | Four compartment cars only. Transverse portions of BOV saddle weld. | YES | YES | YES | YES | YES | YES | YES | YES | YES | YES | YES | YES |
| | | N/A | G2 | Single compartment cars only. Longitudinal portions of BOV saddle weld. | YES | YES | YES | YES | YES | YES | YES | YES | YES | YES | YES | YES |
| | | N/A | G2a | Two compartment cars only. Longitudinal portions of BOV saddle weld. | YES | YES | YES | YES | YES | YES | YES | YES | YES | YES | YES | YES |
| | | N/A | G2b | Three compartment cars only. Longitudinal portions of BOV saddle weld. | YES | YES | YES | YES | YES | YES | YES | YES | YES | YES | YES | YES |
| | | N/A | G2c | Four compartment cars only. Longitudinal portions of BOV saddle weld. | YES | YES | YES | YES | YES | YES | YES | YES | YES | YES | YES | YES |
| Sump-to-Tank | TPM SKPM WTK WTT OTH | N/A | H1 | Single compartment cars only. Transverse portions of BOV Sump weld. | YES | YES | YES | YES | YES | YES | YES | YES | YES | YES | YES | YES |
| | | N/A | H1a | Two compartment cars only. Transverse portions of BOV Sump weld. | YES | YES | YES | YES | YES | YES | YES | YES | YES | YES | YES | YES |
| | | N/A | H1b | Three compartment cars only. Transverse portions of BOV Sump weld. | YES | YES | YES | YES | YES | YES | YES | YES | YES | YES | YES | YES |

*Figure 11g*

TANK CAR WELD INSPECTION MATRIX

| COMPONENT | DEFECT CODE | CAR LOCATION | WELD CODE | WELD CODE DESCRIPTION | CAR BUILDER & STUB SILL DESIGN ||||||||||||
|---|---|---|---|---|---|---|---|---|---|---|---|---|---|---|---|
| | | | | | RIC-RJC RIC-WBR | NAC-DEF NAC-GHI | AMF-ABC AMF-JKL | EVA-EVA EVA-WBR | ACF-100 | ACF-200 ACF-270 | ACF-230 | UTL-ZBN | TRN-TY3 | TRN-021 | TRN-022 | TRN-023 |
| Sump-to-Tank (con't) | | N/A | H1c | Four compartment cars only. Transverse portions of BOV Sump weld. | YES | YES | YES | YES | YES | YES | YES | YES | YES | YES | YES | YES |
| | | N/A | H2 | Single compartment cars only. Longitudinal portions of BOV Sump weld. | YES | YES | YES | YES | YES | YES | YES | YES | YES | YES | YES | YES |
| | | N/A | H2a | Two compartment cars only. Longitudinal portions of BOV Sump weld. | YES | YES | YES | YES | YES | YES | YES | YES | YES | YES | YES | YES |
| | | N/A | H2b | Three compartment cars only. Longitudinal portions of BOV Sump weld. | YES | YES | YES | YES | YES | YES | YES | YES | YES | YES | YES | YES |
| | | N/A | H2c | Four compartment cars only. Longitudinal portions of BOV Sump weld. | YES | YES | YES | YES | YES | YES | YES | YES | YES | YES | YES | YES |
| BOV Skid to Tank | TPM SKPM WTK WTT OTH | N/A | J2 | Single compartment cars only. Termination of BOV skid longitudinal welds. | YES | YES | YES | YES | YES | YES | YES | YES | YES | YES | YES | YES |
| | | N/A | J2a | Two compartment cars only. Termination of BOV skid longitudinal welds. | YES | YES | YES | YES | YES | YES | YES | YES | YES | YES | YES | YES |
| | | N/A | J2b | Three compartment cars only. Termination of BOV skid longitudinal welds. | YES | YES | YES | YES | YES | YES | YES | YES | YES | YES | YES | YES |

*Figure 11h*

TANK CAR WELD INSPECTION MATRIX

| COMPONENT | DEFECT CODE | CAR LOCATION | WELD CODE | WELD CODE DESCRIPTION | RJC-RJC RJC-WBR | NAC-DEF NAC-GHI | AMF-ABC AMF-JKL | EVA-EVA EVA-WBR | ACF-100 | ACF-200 ACF-270 | ACF-230 | UTL-ZBN | TRN-TY3 | TRN-021 | TRN-022 | TRN-023 |
|---|---|---|---|---|---|---|---|---|---|---|---|---|---|---|---|---|
| BOV Skid to Tank (con't) | | N/A | J2c | Four compartment cars only. Termination of BOV skid longitudinal welds. | YES | YES | YES | YES | YES | YES | YES | YES | YES | YES | YES | YES |
| Girth Seam Welds (The number of girth seam welds will vary from tank car to tank car) | WC WP TPM LF LP OTH | Left, Right | GS1 | First girth seam weld from the 'B' end. | YES | YES | YES | YES | YES | YES | YES | YES | YES | YES | YES | YES |
| | | Left, Right | GS2 | Second girth seam weld from the 'B' end. | YES | YES | YES | YES | YES | YES | YES | YES | YES | YES | YES | YES |
| | | Left, Right | GS3 | Third girth seam weld from the 'B' end. | YES | YES | YES | YES | YES | YES | YES | YES | YES | YES | YES | YES |
| | | Left, Right | GS4 | Fourth girth seam weld from the 'B' end. | YES | YES | YES | YES | YES | YES | YES | YES | YES | YES | YES | YES |
| | | Left, Right | GS5 | Fifth girth seam weld from the 'B' end. | YES | YES | YES | YES | YES | YES | YES | YES | YES | YES | YES | YES |
| | | Left, Right | GS6 | Sixth girth seam weld from the 'B' end. | YES | YES | YES | YES | YES | YES | YES | YES | YES | YES | YES | YES |
| | | Left, Right | GS7 | Seventh girth seam weld from the 'B' end. | YES | YES | YES | YES | YES | YES | YES | YES | YES | YES | YES | YES |
| | | Left, Right | GS8 | Eighth girth seam weld from the 'B' end. | YES | YES | YES | YES | YES | YES | YES | YES | YES | YES | YES | YES |
| | | Left, Right | GS9 | Ninth girth seam weld from the 'B' end. | YES | YES | YES | YES | YES | YES | YES | YES | YES | YES | YES | YES |
| | | Left, Right | GS10 | Tenth girth seam weld from the 'B' end. | YES | YES | YES | YES | YES | YES | YES | YES | YES | YES | YES | YES |
| Draft Sill Welds | SPPM WVSS WSS WSPS WWBS OTH | A- & B-End | MSa | Splice plates. | YES | YES | YES | YES | YES | YES | YES | YES | YES | YES | YES | YES |
| | | AR, AL, BR, BL | MSb | Wing bars. | YES | YES | YES | YES | YES | YES | YES | YES | YES | YES | YES | YES |
| | | A- & B-End | MSc | Vertical Stiffeners. | YES | YES | YES | YES | YES | YES | YES | YES | YES | YES | YES | YES |
| | | N/A | MSd | Slot welds. | YES | YES | YES | YES | YES | YES | YES | YES | YES | YES | YES | YES |

Figure 11i

TANK CAR WELD INSPECTION MATRIX

| COMPONENT | DEFECT CODE | CAR LOCATION | WELD CODE | WELD CODE DESCRIPTION | CAR BUILDER & STUB SILL DESIGN ||||||||||||
|---|---|---|---|---|---|---|---|---|---|---|---|---|---|---|---|
| | | | | | RIC-RIC RIC-WBR | NAC-DEF NAC-GHI | AMF-ABC AMF-JKL | EVA-EVA EVA-WBR | ACF-100 | ACF-200 ACF-270 | ACF-230 | UTL-ZBN | TRN-TY3 | TRN-021 | TRN-022 | TP |
| Misc. Transverse Welds > ½" within 4 feet of bottom centerline. | PPM | AR, AL, BR, BL | MTa | Misc. transverse weld. | YES | YES | YES | YES | YES | YES | YES | YES | YES | YES | YES | Yes |
| | TPM | AR, AL, BR, BL | MTb | Misc. transverse weld. | YES | YES | YES | YES | YES | YES | YES | YES | YES | YES | YES | YES |
| | WTP | AR, AL, BR, BL | MTc | Misc. transverse weld. | YES | YES | YES | YES | YES | YES | YES | YES | YES | YES | YES | YES |
| | WTT | AR, AL, BR, BL | MTd | Misc. transverse weld. | YES | YES | YES | YES | YES | YES | YES | YES | YES | YES | YES | YES |
| | OTH | AR, AL, BR, BL | MTe | Misc. transverse weld. | YES | YES | YES | YES | YES | YES | YES | YES | YES | YES | YES | YES |
| | | AR, AL, BR, BL | MTf | Misc. transverse weld. | YES | YES | YES | YES | YES | YES | YES | YES | YES | YES | YES | YES |
| Misc. Longitudinal Welds > ½" within 4 feet of bottom centerline. | PPM | AR, AL, BR, BL | MLa | Misc. longitudinal weld. | YES | YES | YES | YES | YES | YES | YES | YES | YES | YES | YES | YES |
| | TPM | AR, AL, BR, BL | MLb | Misc. longitudinal weld. | YES | YES | YES | YES | YES | YES | YES | YES | YES | YES | YES | YES |
| | WTP | AR, AL, BR, BL | MLc | Misc. longitudinal weld. | YES | YES | YES | YES | YES | YES | YES | YES | YES | YES | YES | YES |
| | WTT | AR, AL, BR, BL | MLd | Misc. longitudinal weld. | YES | YES | YES | YES | YES | YES | YES | YES | YES | YES | YES | YES |
| | OTH | AR, AL, BR, BL | MLe | Misc. longitudinal weld. | YES | YES | YES | YES | YES | YES | YES | YES | YES | YES | YES | YES |
| | | AR, AL, BR, BL | MLf | Misc. longitudinal weld. | YES | YES | YES | YES | YES | YES | YES | YES | YES | YES | YES | YES |

[1] Sill top cover-to-tank transverse weld.
[2] 7" Transverse weld. On some cars this weld will be continuous around outboard end of part. On most cars, this weld will be 5" to 8 ½" in length, terminating at backstop reinforcements.

FIGURE 12C
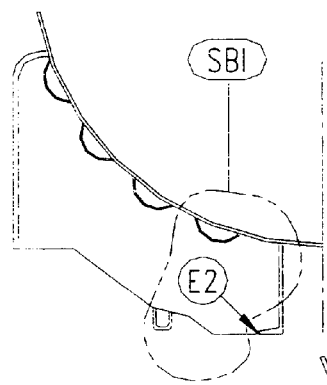
Fig. 1
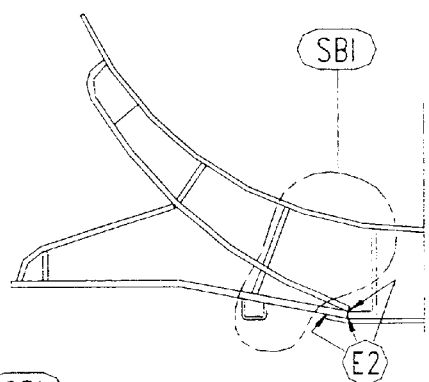
Fig. 2
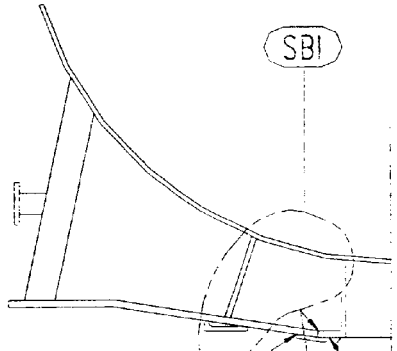
Fig. 3
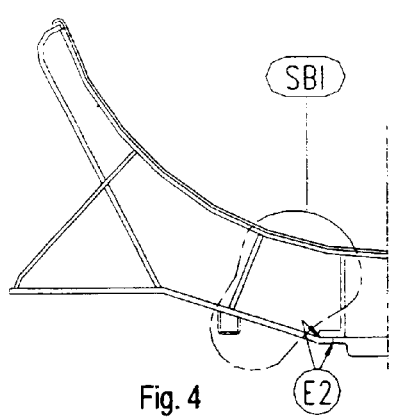
Fig. 4
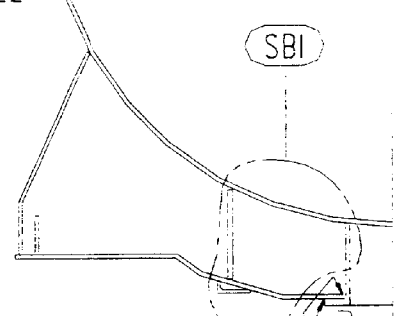
Fig. 5

Figure 13

| Complete Extended Life Cycle | Defect Type | Lining Condition | | | |
|---|---|---|---|---|---|
| | | Excellent A | Good B | Fair C | Poor D |
| 0 - 25 % | Crack | No Defects | No Defects | > No. 8 | > No. 6 |
| | Blister | No Defects | > No. 8 (2.5%) | > No. 6 (15%) | > No. 6 (45%) |
| | Corrosion | No Defects | No Defects | > Re 1 | > Re 2 |
| | DFT | > 8 mils | > 7 mils | > 6 mils | < 6 mils |
| | Stains | No Spots | No Spots | < 10 Sq. Ft | > 10 Sq. Ft |
| 26 - 42 % | Crack | No Defects | No Defects | > No. 8 | > No. 6 |
| | Blister | No. 6 (2.5%) | > No. 6 (15%) | > No. 4 (45%) | > No. 2 (15%) |
| | Corrosion | No Defects | No Defects | < Re 2 | < Re 2 |
| | DFT | > 7 mils | > 7 mils | > 6 mils | < 6 mils |
| | Stains | No Spots | No Spots | < 20 Sq. Ft | > 20 Sq. Ft |
| 43 - 58 % | Crack | No Defects | No Defects | > No. 8 | > No. 4 |
| | Blister | > No. 6 (2.5%) | > No. 6 (15%) | > No. 4 (15%) | > No. 4 (15%) |
| | Corrosion | No Defects | No Defects | < Re 2 | < Re 2 |
| | DFT | > 6 mils | > 5 mils | < 5 mils | < 5 mils |
| | Stains | No Spots | < 10 Sq. Ft | < 20 Sq. Ft | > 20 Sq. Ft |
| 59 - 83 % | Crack | No Defects | No Defects | > No. 6 | > No. 4 |
| | Blister | No. 6 (15%) | > No. 4 (15%) | > No. 2 (15%) | > No. 2 (45%) |
| | Corrosion | No Defects | No Defects | < Re 2 | < Re 2 |
| | DFT | > 5 mils | > 5 mils | > 5 mils | < 5 mils |
| | Stains | < 10 Sq. Ft | < 10 Sq. Ft | < 20 Sq. Ft | > 20 Sq. Ft |
| > 83 % | Crack | No Defects | No Defects | > No. 4 | > No. 4 |
| | Blister | > No. 4 (15%) | > No. 4 (15%) | > No. 4 (15%) | > No. 4 (15%) |
| | Corrosion | No Defects | No Defects | < Re 2 | < Re 3 |
| | DFT | > 5 mils | > 5 mils | > 5 mils | < 5 mils |
| | Stains | < 10 Sq. Ft | < 10 Sq. Ft | < 20 Sq. Ft | > 20 Sq. Ft |

*Figure 14*

Allowable Shell Thickness Reductions

| Damage Type | CLASS DOT 103, 104, 111, and 115 Tank Cars | | CLASS DOT 105, 109, 112 and 114 Tank Cars | |
|---|---|---|---|---|
| | Top Shell | Bottom Shell | Top Shell | Bottom Shell |
| Corrosion | 3.17 mm (0.125 inch) (1/8 inch) | 1.58 mm (0.063 inch) (1/16 inch) | 0.79 mm (0.031 inch) (1/32 inch) | 0.79 mm (0.031 inch) (1/32 inch) |
| Corrosion and Mechanical | 3.17 mm (0.125 inch) (1/8 inch) | 1.58 mm (0.063 inch) (1/16 inch) | 0.79 mm (0.031 inch) (1/32 inch) | 0.79 mm (0.031 inch) (1/32 inch) |
| Corrosion (local) | 4.76 mm (0.188 inch) (3/16 inch) | 3.17 mm (0.125 inch) (1/8 inch) | 1.58 mm (0.063 inch) (1/16 inch) | 1.58 mm (0.063 inch) (1/16 inch) |
| Mechanical (local) | 3.17 mm (0.125 inch) (1/8 inch) | 1.58 mm (0.063 inch) (1/16 inch) | 1.58 mm (0.063 inch) (1/16 inch) | 1.58 mm (0.063 inch) (1/16 inch) |
| Corrosion and Mechanical (local) | 4.76 mm (0.188 inch) (3/16 inch) | 3.17 mm (0.125 inch) (1/8 inch) | 1.58 mm (0.063 inch) (1/16 inch) | 1.58 mm (0.063 inch) (1/16 inch) |

Figure 15

Lining System Operating Characteristics

| Lining System | approx. dft | Properties | Recommended Service | Failure Criteria | Estimated Life |
|---|---|---|---|---|---|
| (Unmodified) High Bake Phenolic (400°F) | 8 to 10 mils in multiple coats | Very good Water Resistance Good Corrosion Resistance High Temperature Resistant Difficult to repair or to touch-up | Organic and Inorganic Acids (concentrated and diluted) Less suitable for strong Alkalis Resistant against most Solvents Can be used for Food Grade Chemicals | Cracking due to mechanical impact (direct or reverse), temperature cycling or vibration. Hydrogen grooving of steel under coating in highly concentrated sulfuric acid. | 8 years |
| (Modified) High Bake Phenolic (400°F) | 8 to 10 mils in multiple coats | Very good Water Resistance Good Corrosion Resistance Less brittle than unmodified phenolics | Diluted Organic and Inorganic Acids Good resistance against strong Alkalis Can be used for Food Grade Chemicals Resistant to most Solvents | Cracking due to mechanical impact (direct or reverse), temperature cycling or vibration. | 8 years |
| (Modified) High Bake Epoxy/Amine (400°F) | 12 to 15 mils in 2 coats | Very good Water Resistance Good Corrosion Resistance Two-pack materials | Diluted Organic and Inorganic Acids Very good resistance against hot alkalis Good Solvent Resistance | Becomes brittle on aging. May blister in unsuitable chemicals. May crack under impact and bending. | 7 years |
| (Modified) Low Bake Epoxy/Amine (250°F) | 12 to 15 mils in 2 coats | Good Water Resistance Good Corrosion Resistance Two-pack materials | Diluted, non oxidizing Inorganic Acids Very good resistance against hot alkalis Good Solvent Resistance | Becomes brittle on aging. May blister and/or soften in certain chemicals. May crack under impact and bending. | 7 years |
| Epoxy/Phenolic/Amine air-dry or force curing | 12 to 15 mils | Good Water Resistance Good Corrosion Resistance Two-pack materials | Acidity not lower than pH 2 Very good Alkali Resistance Good Solvent Resistance | Becomes brittle on aging. May blister and/or soften in certain chemicals. May crack under impact and bending | 7 years |
| Epoxy/Amine Solvent Free. Air dry of Force Curing (*) | 12 to 15 mils in 1 coat | Good Water Resistance Good Corrosion Resistance Plural Component Appl. | Diluted, non oxidizing Inorganic Acids Very good resistance against Alkalis Good Solvent Resistance | Becomes slightly brittle with aging. May slightly soften in certain solvents. Better Crack and Impact Resistant | 8 years |
| Epoxy/Polyamidoamine Force curing | 10 - 14 mils 2 coats | Good Water Resistance Good Corrosion Resistance Two-pack materials | Good resistance against diluted alkalis Resistant against some solvents Can be Food Grade Compliant | Becomes slightly brittle with aging. May blister or soften in certain solvents Fair Crack and Impact Resistant. | 6 years |
| Rubber Sheet Lining | N/A | Application using in-situ vulcanizing and adhesives. | Good Acid and Alkali Resistance Not suitable for most Solvents Maximum Temperature 150°F Hard rubber better resistant than soft rubber | Oxidizing chemicals may attack the sheet lining and embrittle. Sheets may loose adhesion. Welds may deteriorate (corrosion) | 12 years |

METHOD AND DATABASE ARRANGEMENT FOR INSPECTION AND REQUALIFICATION OF VEHICLES USED FOR TRANSPORTING COMMODITIES AND/OR HAZARDOUS MATERIALS

CROSS-REFERENCE TO PROVISIONAL APPLICATION

This application claims priority from U.S. provisional patent application Ser. No. 60/157,057 filed Oct. 1, 1999, the entire disclosure of which is incorporated herein by reference.

BACKGROUND OF THE INVENTION

1. Field of the Invention

The invention relates generally to safety inspections and requalification transport arrangements. More specifically, the invention relates to a method and arrangement for the inspection and requalification of tank cars and the like type of cargo carrying vehicles adapted to transport commodities including regulated and un-regulated materials.

2. Description of the Related Art

Until recently, the inspection process for Department of Transportation (DOT) specified rail-borne tank cars transporting either hazardous or non-hazardous commodities was relatively simple. The inspections consisted of hydrostatically testing the tank-car, typically performed on a 10-year interval. However, this conventional testing methodology only detected through-wall cracks and was insufficient to detect cracks that were slightly less than a through-wall crack. Consequently, some tanks failed shortly after being hydro-tested. HM-201, later codified in 49 C.F.R. Subpart F §§180.500 et al. (hereinafter 49 C.F.R. §180) was developed to provide a more comprehensive inspection process using a variety of non-destructive testing (NDT) methods. Namely, 49 C.F.R. §180 includes a (1) Visual Inspection, (2) Structural Inspection, (3) Service Life Shell Thickness Inspection, (4) Safety System Inspection, (5) Lining/Coating Inspection, and (6) Leakage Pressure Test.

As set forth in 49 C.F.R. §180.509, the visual inspection entails external and internal inspection of (1) the tank shell interior and exterior; (2) piping, valves, fittings, & gaskets; (3) missing or loose elements, (4) all closures and protective housings; (5) excess flow valves (when applicable), and (6) all the required markings on the Tank Car. The Structural Inspection requires, at a minimum, inspection of all transverse fillet welds greater than 0.25 inches within 4 feet of the bottom longitudinal centerline; the termination of longitudinal fillet welds greater than 4 feet from the bottom longitudinal center line; and all tank shell butt welds within 2 feet of the bottom longitudinal center line. These structural inspections may be performed by dye penetrant, radiography, magnetic particle, ultrasonic, or optically-aided tests. The Service Life Shell Thickness Inspection requires inspection of the thickness of the tank car shell, heads, sumps, domes, and nozzles with a device accurate to within +/−0.002 inches. A tank car with a shell thickness below a required minimum thickness (set forth in 49 C.F.R. §§179.100-6 and 179.101-1) may be permitted to continue operation under 49 C.F.R. §180.509 if certain additional criteria are met, set forth therein.

The Safety System Inspection requires, at a minimum, inspect the thermal protection systems, tank head puncture resistance systems, coupler vertical restraint systems, and systems used to protect discontinuities(i.e., skid protection and protective housings)to ensure their integrity. It also requires removing the safety relief device from the Tank Car and testing of the device with air or another gas to ensure that it conforms to the start-to-discharge pressure for the specification or hazardous material. The Lining and Coating Inspection requires, at a minimum, inspection of the lining or coating installed on the tank car according to the inspection interval, test technique, and acceptance criteria established by the owner of the lining or coating. Finally, 49 C.F.R. §180.509 requires a Leakage Pressure Test after re-assembly of a tank car or service equipment, wherein a tank car facility must perform a leak test on the tank or service equipment to detect leakage, if any, between manway covers, cover plates, and service equipment.

These inspections are generally to be performed on an inspection interval set in accord with the type of tank car and the transported commodity. For cars transporting materials not corrosive to the tank, the inspections above are to be performed at a maximum of every 10 years for the tank and service equipment. For non-lined or non-coated tank cars transporting materials corrosive to the tank, an interval (i) may be set in accord with the difference between the actual thickness and the allowable minimum thickness divided by the corrosion rate of the transported commodity, per year. In cases where a lining or coating is applied to protect the tank shell from the lading, the owner of the lining is charged to determine the periodic inspection interval, test technique, and acceptance criteria for the lining or coating. 49 C.F.R. §180 has since been supplemented by Alternative Tank Car Requalification Program, Appendix B to DOT-E 12095 (hereinafter "DOT 12095"). DOT 12095 is substantially similar to 49 C.F.R. §180; however, it eliminates the dependence of the allowable minimum thickness on corrosion and, instead, sets forth a list of forty corrosive materials in Attachment A thereto and, for non-lined and non-coated tanks, ties the tank shell thickness qualification frequencies to both the transport of a material listed in Attachment A and the measured remaining shell and head thickness. Thus, the revised standard provides more definite criteria for determination of tank thickness in the absence of corrosion rates required by the formula of 49 C.F.R. §180. However, DOT 12095 requires that owner's follow the alternative program provided therein to develop written procedures to ensure tank car safety, as required by 49 C.F.R §179.7(d), but places the burden, as 49 C.F.R. §180, on the owner's to develop qualification programs for each tank car, or a fleet of tank cars, identifying where to inspect, how to inspect, and the inspection criteria to complement the minimal guidance provided therein.

Other inspection guidelines have been issued to improve tank car safety. Rule 88.B.2 issued by the Federal Railroad Administration(FRA) requires, every five years, a "thorough inspection must be performed and repairs where necessary be made to the following: (1) Body bolsters and center plates; (2) Center sills; (3) Crossbearers; (4) Crossties; (5) Draft systems and components; (6) End sills; (7) Side sills; (8) Trucks; and (9) Car jackets. In addition, various AAR (Association of American Railroads) circulars prescribe inspection intervals and guidelines for stub sill tank cars based on a damage tolerance analysis (DTA) philosophy or at a default inspection interval of five years or 75,000 miles. However, the AAR Tank Car Stub Sill Inspection Program, requests owners to develop written procedures that encompass: (1) Identifying structurally significant components and welds; (2) a means of access to these components and welds, including removal of the jacket, insulation, or thermal coating, if required; (3) inspection techniques to ensure the detection of damage; and (4) proper identification, measurement, and reporting of cracks by line item on the required inspection report form (AAR Form SSIP).

Thus, to improve the level of safety and security with which hazardous materials can be transported from one place to another, it has been proposed to increase the requirements for the qualification and maintenance of tank cars which are used to transport such materials along the rail systems of the country. However, these requirements impose a significant burden on the tank car and tank car lining owners to develop and implement procedures to provide the mandated level of safety and ensure this level of safety between inspections of the tank cars, tank car linings, and appurtenant equipment. The actual manner in which the tests may be satisfactorily carried out have not been defined in terms sufficiently specific to detail just what type of tests are required and how these tests need to be actually carried out to ensure that all of the features and structures which tend to be at high risk, are examined in a proper manner. In other words, a worker skilled in the art of inspecting tank cars, even with many years of experience, would need guidance as to the totality of how many parameters to test for, how many sites need to be examined and with what equipment should the tests be implemented.

A further shortcoming in the art is that there has been no concerted effort to record the results which are derived and to compile this data in a form which will enable the status of each of the vessels, tanks bogies and the like which are inspected, to be tracked over a period of time and enable a relatively accurate prediction as to the status of each of a fleet of units.

Further, the revised inspection requirements impose additional and varied inspection cycles, including for example, unique test cycles for lined cars in corrosive service versus unlined cars in corrosive service. The cycle for unlined cars in corrosive service is determined by rate of corrosion versus remaining allowable shell thickness whereas the cycle for lined cars in corrosive service is set to 10 years. However, for lined cars in corrosive service the service equipment must be inspected every five years, thus requiring the tank car to be brought in for inspection every five years. Additionally, there are two separate required stub sill inspections—SSIP and Rule 88.B.2, which may run on staggered inspection cycles. Therefore, for a given tank car, an SSIP inspection may be required and performed in year 1, a Rule 88.B.2 inspection may be required and performed in the following year, and a HM-201 inspection may be required and performed in year 3, the staggered sequence to be continued into future years.

Historically, the industry has deferred tank car inspections and maintenance as long as possible to minimize and defer immediate expenditures. Conventional wisdom, therefore, permits cars to be brought into a facility on multiple occasions over a 10 year period. Although in one respect this minimizes costs for a particular, it is inefficient over longer time periods. Further, the increased non-destructive testing mandated by 49 C.F.R. §180 is likely to increase backlogs at test facilities. The average time a car remains in the shop facility is approximately 30 days. In accord with common business practices, the tank car will "come off of lease" after five days of inactivity and rental credits are issued to the entity leasing the car since the entity does not want to be liable for periods of inactivity of the leased tank car. The increased inspection requirements will necessarily entail longer periods of tank car inactivity in the facility and increased backlogs, further resulting in additional losses to the facility due to cars coming off lease and staying off lease for longer periods. In short, the facility loses money if a tank car is brought in too frequently.

It is therefore evident that there is a need for some form of highly detailed inspection, analysis, and tracking system to conservatively increase the interval between required inspections and reduce overall inspection costs.

SUMMARY OF THE INVENTION

The invention broadly provides a method of inspecting regulated and non-regulated tank cars used to transport commodities and a system by which inspection data obtained during the inspection of such tank cars may be managed, tracked, and analyzed.

In one aspect of the invention, a method of requalifying a rail born tank car adapted to transport commodities is provided. This method includes inspecting the tank car in accord with a selected one of a plurality of procedures, each procedure delineating and defining a pre-determined plurality of inspections and test. Inspection data obtained from the predetermined series of steps and tests is input into a computer-readable storage medium, where it is related by a computer having at least one processor, to secondary data, such as ownership data, lease status data rental status data, and/or transported commodity data. Based on this relation, the computer computes a requalification date for the tank car based on the input inspection data and the secondary data. This requalification date is output to at least one of a computer-readable storage medium, a display device, and a physical print media inclusive of an outer surface of the tank car.

In another aspect of the invention, a test procedure for inspecting a vehicle adapted to transport commodities includes compiling inspection data in accord with a predetermined exhaustive list of features set forth in at least one instruction set, the results thereof being input into a computer readable medium. Using a computer, a lowest dimensional data value for a selected feature is selected from the input data along with a corresponding minimum permissible dimensional value for the selected feature. Also using the computer, a difference between the minimum permissible dimensional value and the lowest dimensional data value is computed and divided by a third value indicative of a selected form of deterioration over time to derive a date at which the vehicle should be subjected to re-inspection and requalification. This computed requalification date is output from the computer to at least one of a computer-readable storage medium, a display device, and a physical print media inclusive of an outer surface of the tank car.

Still another aspect of the invention includes a computer-readable medium bearing instructions enabling a computer having at least one processor to determine a requalification date of a tank car adapted to transport commodities, the instructions, when executed by a computer, causing the computer to carry out the steps of determining a type of vehicle under inspection and selecting from an instruction set an exhaustive list of sites to be inspected for the identified type of vehicle. The computer-readable medium bearing instructions further enabling the computer to output to a user each listed site in accord with the instruction set forth for each of the listed sites in the instruction set and store data derived from implementation of the inspection instruction set for each of the exhaustive list of sites input into the computer-readable medium by the user. The computer-readable medium bearing instructions further enables the computer to access from the same or another computer-readable medium a first record including dimensional inspection data and a second record including commodity data and to determine a requalification date for the tank car based on a comparison of the first record and the second record.

Additional aspects of the present invention will become readily apparent to those skilled in this art from the following detailed description, wherein only the preferred embodiment of the present invention is shown and described, simply by way of illustration of the best mode contemplated for carrying out the present invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The various features and advantages of the present invention will become more clearly appreciated as a detailed description of a preferred embodiment is given with reference to the appended drawings and several appendices, wherein:

FIG. 3 is a second flow chart depicting a requalification routine implemented in accord with the invention;

FIG. 5 shows a sample tank shell attachment weld defect report used in accord with the invention.

FIG. 6 shows a sample tank shell girth weld defect report used in accord with the invention.

FIG. 7 shows a sample ultrasonic service life shell thickness report used in accord with the invention.

FIG. 8 shows a sample ultrasonic evidence of damage report used in accord with the invention.

FIG. 9 shows a sample lining system defect report used in accord with the invention.

FIG. 10 shows a sample tank car requalification report used in accord with the invention.

FIGS. 11a–11i show an example of a tank car weld inspection matrix and database in accord with the invention.

FIGS. 12a–12h depict examples of inspection sites in accord with a selected aspect of FIGS. 11a–11i.

FIG. 13 illustrates an example of a matrix or database used to assign a liner condition value in accord with a remaining life of the tank and inspection data.

FIG. 14 shows allowable shell thickness reductions.

FIG. 15 shows a relation between the estimated lining life for various linings and the corrosiveness of transported commodities

DETAILED DESCRIPTION OF THE PREFERRED EMBODIMENTS

Figure 1:
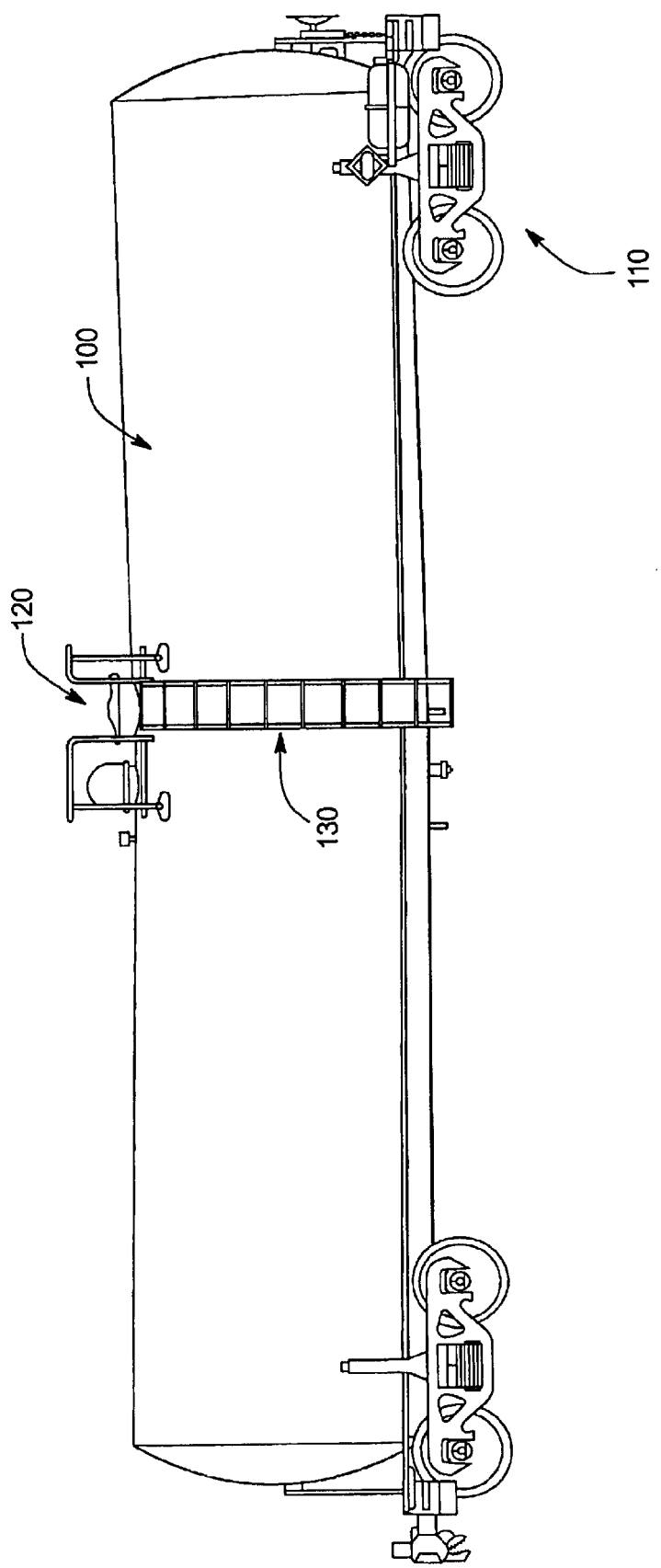
FIG. 1 is a side view showing a typical tank car configuration.

FIG. 1 depicts a typical tank car which is subjected to examination and requalification. As shown this vehicle, which is used to transport commodities, consists basically of a tank structure 10 and wheeled carriages 20 connected to the underside thereof. It should be noted that, irrespective of the type of tank car which is involved, the tank per se is invariably a self-contained structure sufficiently rigid/strong to support not only its own weight but the weight of the cargo which is introduced into the tank. The under structure includes two or more wheeled carriage members or bogies 20 secured to the tank, such as by connectors or by the weight of the tank itself, to complete the basic unit. While various other conventional structures such as a hatch 30, ladder 40, etc., are illustrated, these elements will for brevity not be discussed.

In accord with the invention, there is provided a method of requalifying a rail born tank car adapted to transport commodities, such as illustrated in FIG. 1. This method is provided in a preferred aspect as a computer-readable medium bearing instructions for requalifying a rail born tank car adapted to transport commodities, set instructions arranged, when executed by one or more processors, to cause the one or more processors to perform a desired sequence of steps. Prior to discussion of these and other aspects of the invention, below is described a system which may advantageously be employed in combination with the aspects of the invention disclosed herein.

Figure 2:
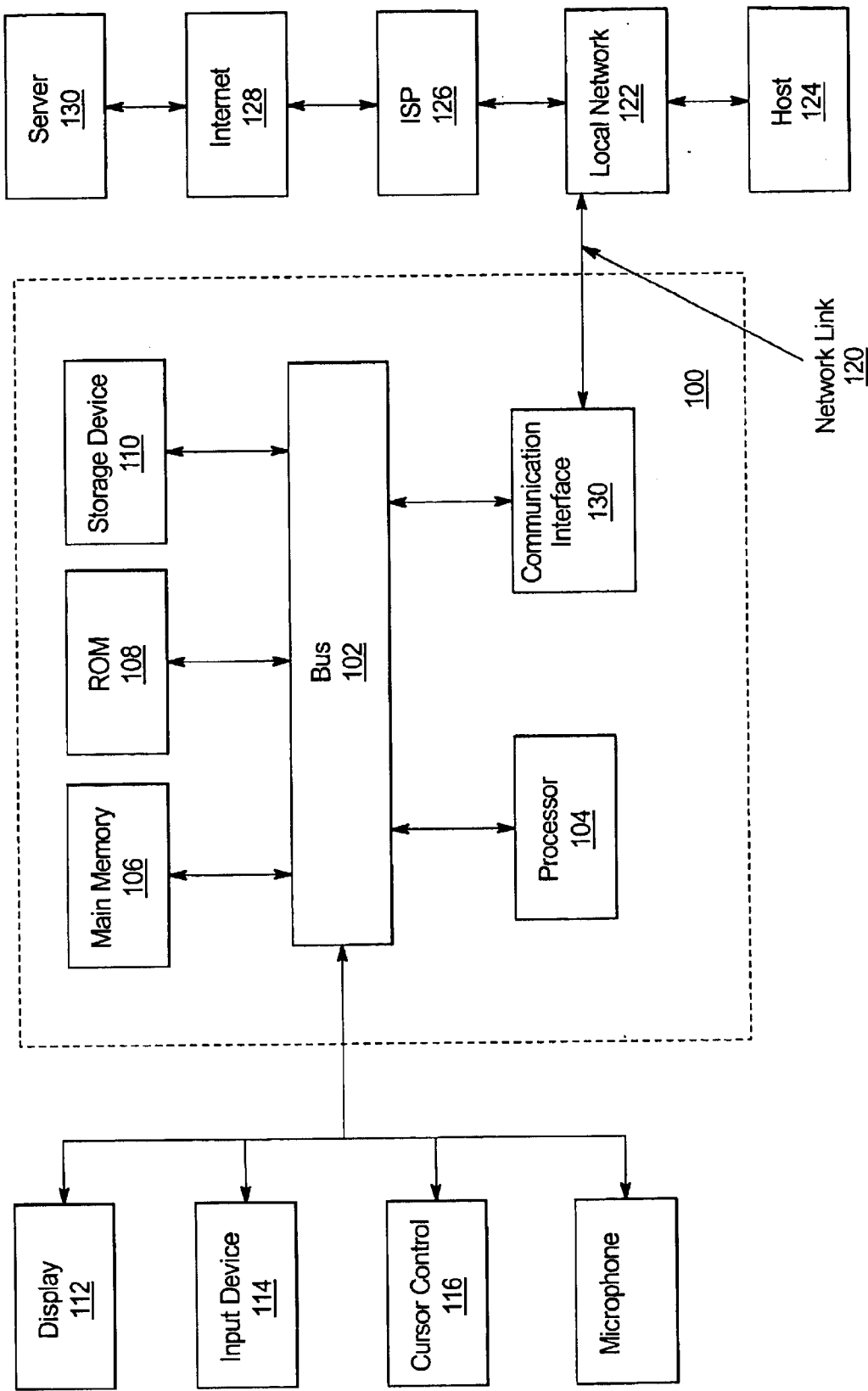
FIG. 2 is a block diagram depicting a computer system upon which an embodiment of the invention may be implemented.

FIG. 2 is a block diagram that illustrates a computer system 100 upon which embodiments of the invention may be implemented. Although presently implemented with an IBM AS400 Legacy system, the invention may be implemented in a variety of platforms and mediums, as discussed below. Computer system 100 includes a bus 102 or other communication mechanism for communicating information, and a processor or processors 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or may be a handheld active or passive display, for displaying information to a computer user. An input device 114, including alphanumeric and other keys, is coupled to bus 102 for communicating information and command selections to processor 104. Other user input devices include cursor control 116, such as a mouse, a trackball, or cursor direction keys for communicating direction information and command selections to processor 104 and for controlling cursor movement on display 112. The input device typically has two degrees of freedom in two axes, a first axis (e.g., x) and a second axis (e.g., y), allowing the device to specify positions in a plane.

Execution of sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions and it is to be understood that no specific combination of hardware circuitry and software are required. Instructions may be provided in any number of forms such as source code, assembly code, object code, machine language, compressed or encrypted versions of the foregoing, and any and all equivalents thereof "Computer-readable medium" refers to any medium that participates in providing instructions to processor 104 for execution and "program product" refers to such a computer-readable medium bearing a computer-executable program. The computer usable medium may be referred to as "bearing" the instructions, which encompass all ways in which instructions are associated with a computer usable medium. Computer-readable mediums include, but are not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. Instructions received by main memory 106 may optionally be stored on storage device 110 either before or after execution by processor 104.

Computer system 100 may also include a communication interface 118 coupled to bus 102 to provide a two-way data communication coupling to a network link 120 connected to a local network 122. For example, communication interface 118 may be an integrated services digital network (ISDN) card or a modem to provide a data communication connection to corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information. Thus the processing required by method of the invention described by way of example herein may be implemented on a local computer utilizing storage device 110 or may be implemented, for example, on a LAN or over the internet.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accord with the invention, one such downloaded application provides for transmitting an inspection procedure to an inspector at a remote inspection data from a central computer and receiving, in the central computer, information transmitted from the inspector at a remote location to permit processing of the inspection information by the central computer. The received code may be executed by processor 104 as it is received, and/or stored in storage device 110, or other non-volatile storage for later execution. In this manner, computer system 100 may obtain application code in the form of a carrier wave.

While the invention has been described with reference to only a few facets thereof, it is submitted that, when in possession of the documentation which is contained in the Appendices of this application, and given the guidance/knowledge of the preceding disclosure, that a person of skill in the art to which the instant invention pertains, would be fully enabled and would be able to implement and practice the claimed invention without difficulty.

The basic requalification process includes six basic parts, as outlined below, and as discussed in detail in co-pending application. The requalification process performed in conjunction with the according to the present invention includes six separate types of inspection delineated in 49 C.F.R. §180.509: (1) Visual Inspection, (2) Structural Inspection, (3) Service Life Shell Thickness Inspection, (4) Safety System Inspection, (5) Lining and Coating Inspection, and (6) Leakage Pressure Test. FIG. 3 depicts the general flow of the requalification process in accord with co-pending utility application (not presently numbered) filed concurrently herewith directed, in part, to requalification of tank cars. This co-pending application claims priority from provisional application 60/157,058, presently titled METHOD AND ARRANGEMENT FOR INSPECTION AND REQUALIFICATION OF VEHICLES USED FOR TRANSPORTING COMMODITIES AND/OR HAZARDOUS MATERIALS (herein after referred to as "the co-pending application" and GE HM-201), and the co-pending utility application filed on Sep. 29, 2000, is hereby incorporated by reference and is briefly described below with respect to FIG. 3.

As shown in FIG. 3, the visual inspection is generally performed in accord with steps 301 to 307. In step 301, the visual inspection of both the interior and the exterior of the tank shell is carried out. Next in step 302, a visual inspection of piping, valves, fittings, and gaskets are carried out. This is followed in step 303 by a visual inspection of brake rigging, safety appliances, draft systems, valves and fitting. When this is completed, a visual inspection of all closures and protective housing on the tank car is carried out in step 304, followed by a visual inspection of the required markings on the tank car in step 305. In the event the tank car has an excess flow valve, as determined in step 306, a visual inspection of this element is carried out in step 307.

Following inspection of the excess flow valve or determination that such a valve is not present on the tank car is steps 306 or 307, an enhanced visual inspection of all fillet welds greater than ¼" which are within 4 feet of the bottom longitudinal center line of the tank is carried out in step 308, as described below in greater detail in preferred embodiments of this step.

Following the above visual inspection, step 309 is performed. In this step, it is determined if the car has interior heater coils. Subsequent to this determination, ultrasonic flaw detection on all circumferential butt-welds of the tank shell which are two feet from the bottom of the longitudinal center line of the car, is carried out in steps 310 or 312. As depicted in the flowchart of FIG. 3, manual ultrasonic welding is performed in the event the car has interior heating coils and automatic ultrasonic welding is performed in the event the car does not have interior heating coils. Although not indicated, manual ultrasonic welding may also be performed when the tank car does not have interior heating coils. In step 311, a hydrostatic coil test is performed if the tank car is found to possess interior heating coils.

At the completion of either of steps 311 or 312, an ultrasonic examination of the tank shell, heads sumps, manways and nozzles of each compartment is carried out in step 313. Ultrasonic examination of these elements applies to all tank cars requiring tank requalification in accord with the invention and it is additionally recommended for any tank cars going on assignment order and/or any tank cars that visually indicate mechanical or corrosion damaged.

Next, in step 314, a visual inspection of the thermal protection system, tank head puncture resistance systems, coupler vertical restraint systems and systems use to protect discontinuities (e.g. skid protection and protective housings) is carried out to ensure their respective integrity. In step 315 the safety relief device is removed from the tank car and visually inspected for damage in accord with the details provided below. In step 316, the device is tested with air to ensure that it conforms to the hazardous material specification for start-to-discharge pressure characteristics.

Next, in step 317, it is determined if the car have a lining for the protection of the tank shell. In the event that it does, then in step 318 the owner ship of the liner is determined. In the event that it is owned by an entity which is different from the owner of the car, then at step 319 the appropriate inspection procedure is obtained from the customer who owns the liner and in step 320 the inspection of the liner is carried out according to the owner's requirements. On the other hand, if the liner is not owned by a separate entity, then at step 321 the liner is inspected in accord with the methods provide in the co-pending application (not presently numbered) filed concurrently herewith. Following the lining inspection in accord with either step 320 or 321, a leakage pressure test is conducted instep 322. After acceptable performance of the leakage pressure test, the car is placed into the repair process in step 323 or prepared for shipping or storage, as applicable.

In accord with the above detailed inspections, the results thereof may be compiled in accord with the invention to permit tracking of the status of each of the vessels, tanks bogies and the like which are inspected, over a period of time and further enable a relatively accurate prediction as to the status of each unit of a fleet of units.

Figure 4C:
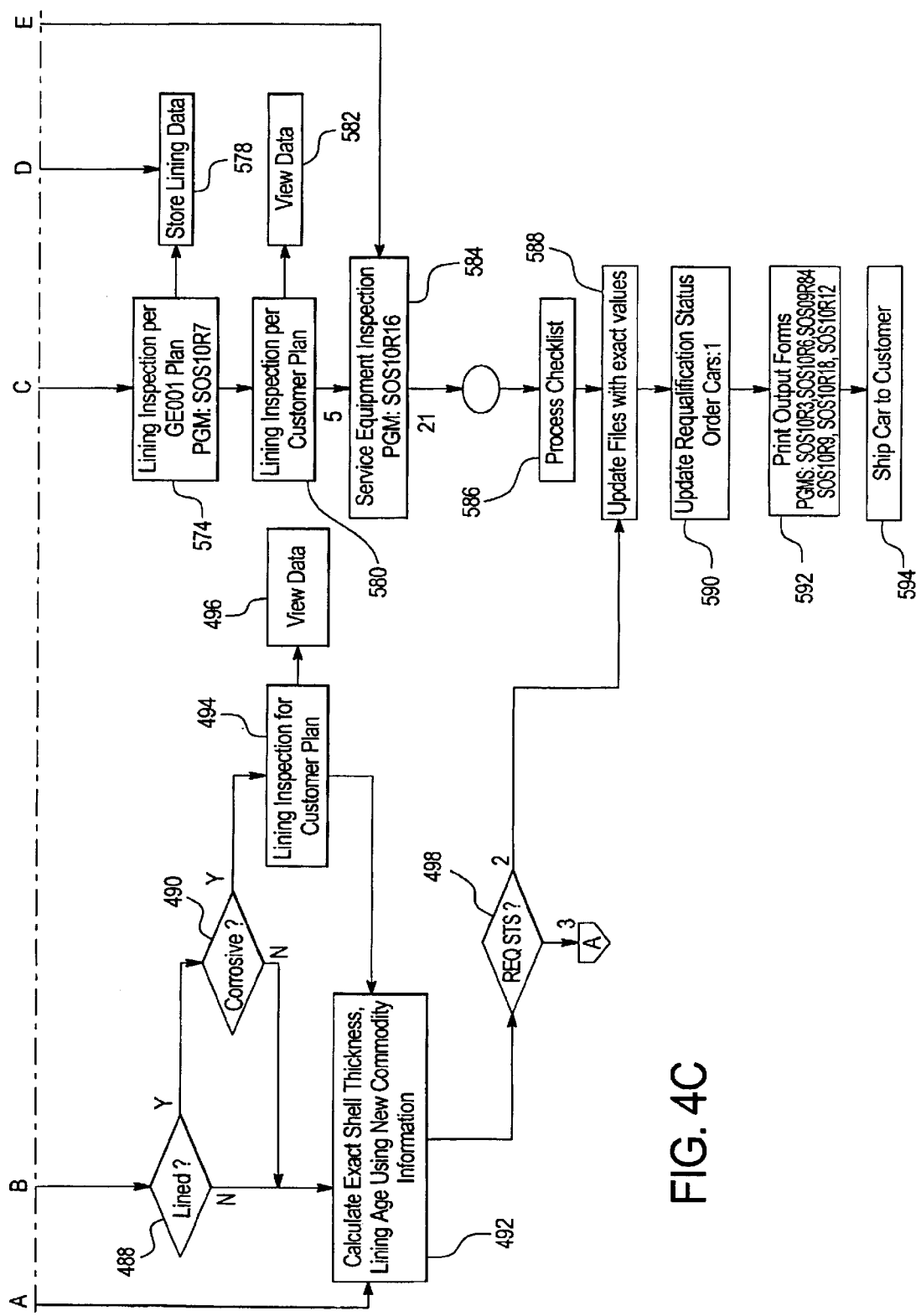
FIG. 4 illustrates a detailed flow diagram of process steps executed in accord with the invention.
Figure 12A:
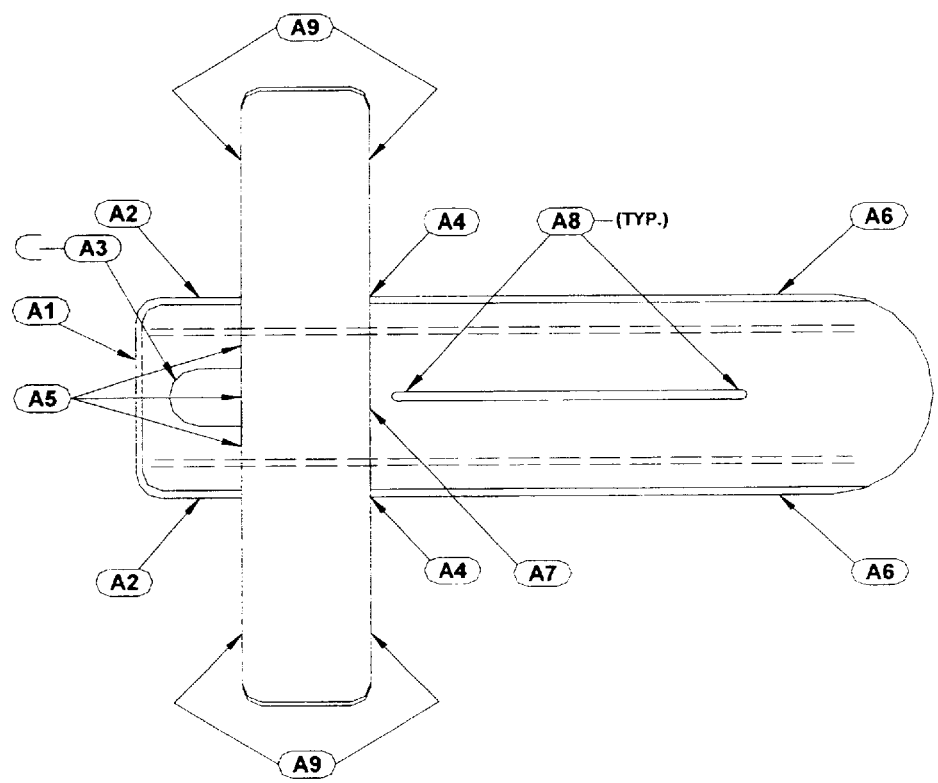
Figure 12B:
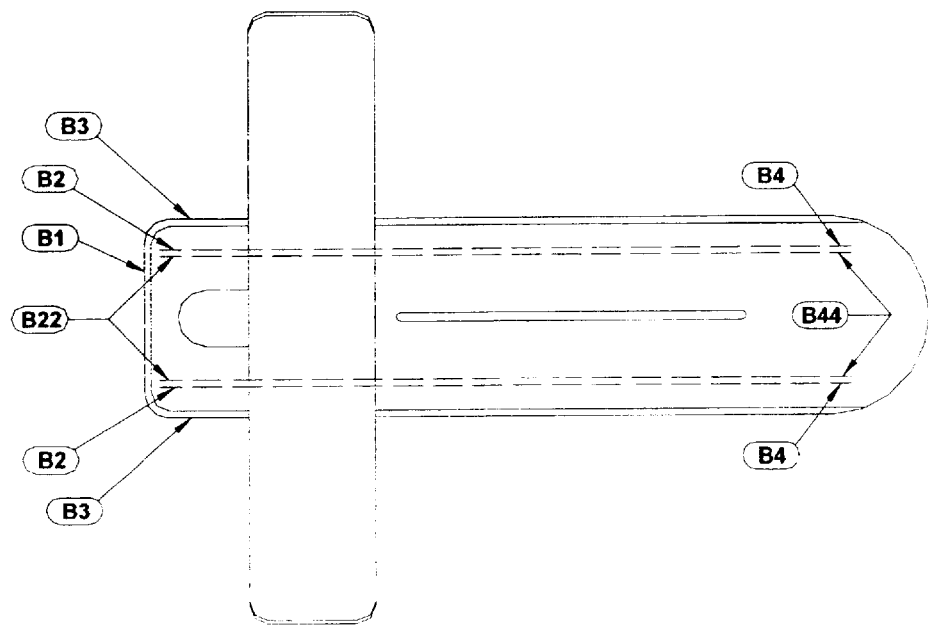
Figure 12D:
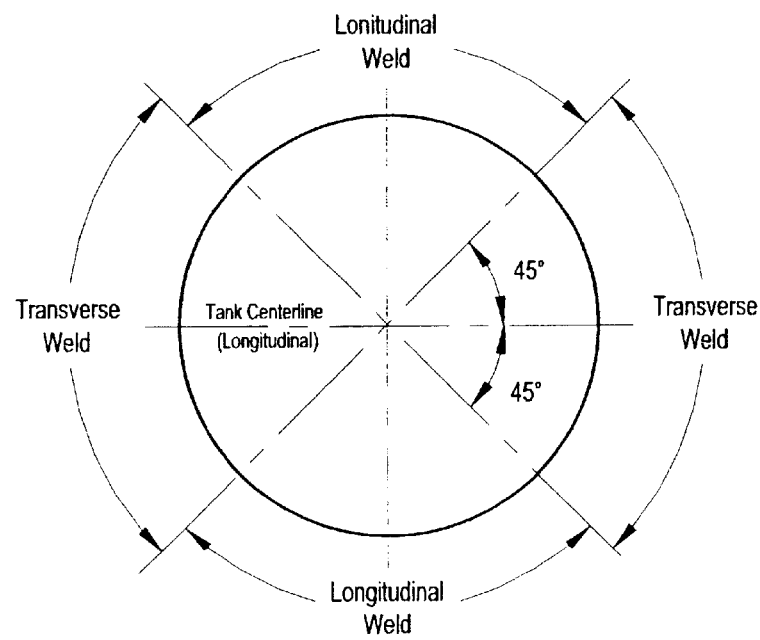
Figure 12E:
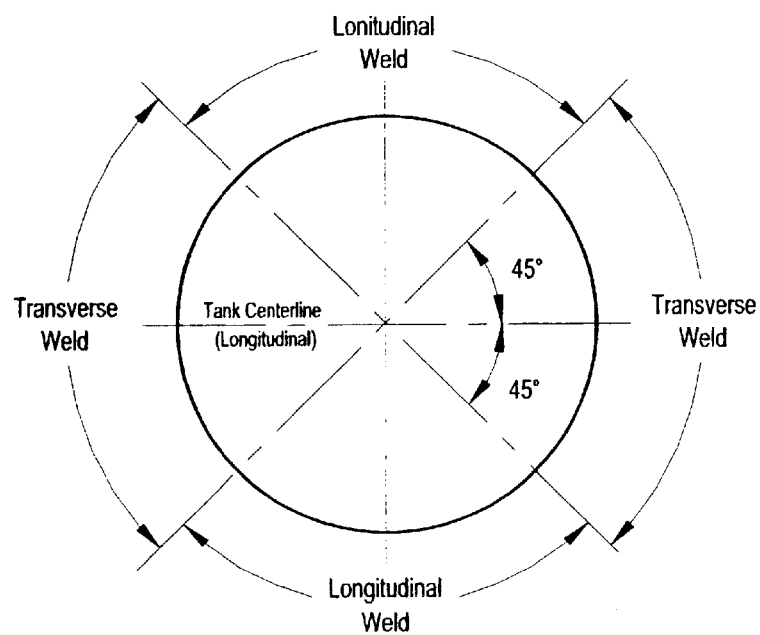
Figure 12F:
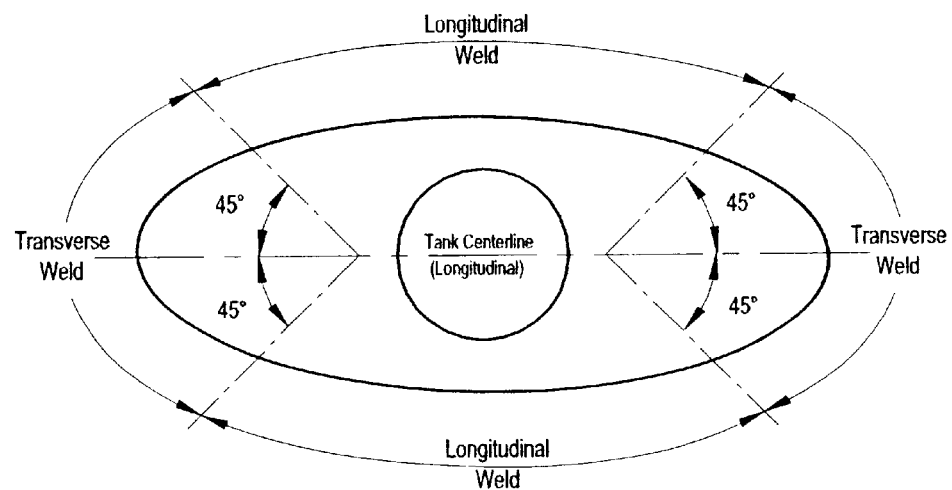
Figure 12G:
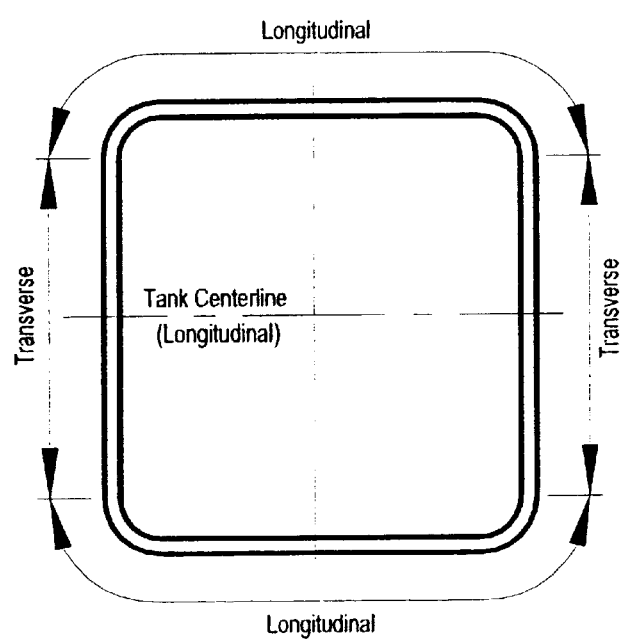
Figure 12H:
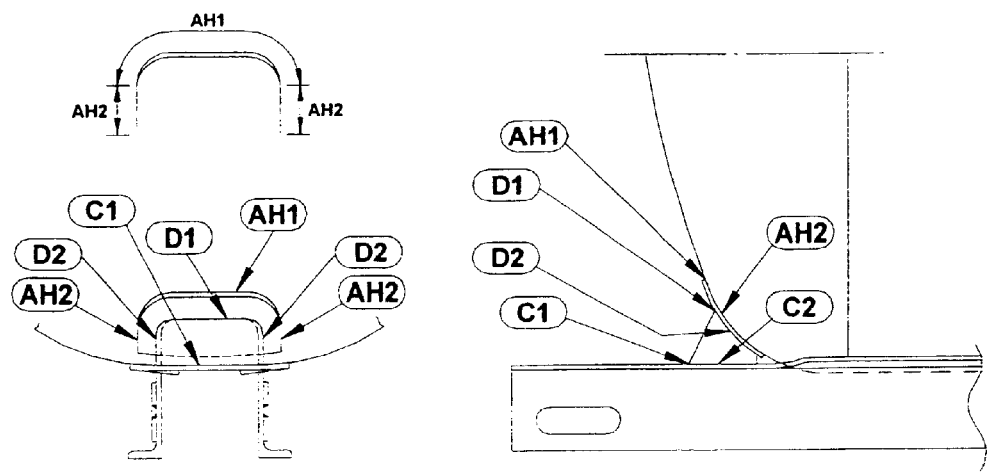

FIG. 4 provides a more comprehensive depiction of the process steps executed in a preferred aspect of the invention. In step 400, the system prompts a user, such as by outputting an appropriate audio or visual signal to a display or transducer in manners known to those skilled in the art, to select of a plurality of possible inspection types. These inspection types may include, for example, (1) a complete GE HM-201 inspection, (2) an ad hoc tank car inspection, (3) a R-1 inspection, (4) a R-2 inspection, (5) a SS-2 inspection or successor thereto (generally referred to as an SSIP or stub sill inspection procedure), and (6) a Rule 88.B.2 inspection. If a user selects a car that is not a tank car or selects an inspection that has already been recently performed for that tank car, it is preferred that the system notify the user of the discrepancy and return the user to the selection menu.

The R-1 and R-2 inspections are not central to the present invention and will not be discussed in detail. These options reflect a current embodiment of the invention wherein data forms required to be filled out and submitted to the AAR regarding disposition of various types of damage detected during an inspection and repaired such as weld repairs, alterations, and conversion for the R-1 form and buckles, corrosion, and crack repairs for the R-2 form.

Similarly, options 2, 5, and 6, above, corresponding to the adhoc, SSIP and Rule 88.B.2 inspections, respectively, are not discussed in detail herein. The particular individual aspects of these procedures, detailed in the aforementioned co-pending application, are included within the below described complete GE HM-201 inspection and it is to be understand that these procedures may be performed in any combination of discrete portions separate and apart from the complete GE HM-201 inspection in accord with the disclosure herein.

Step 400 may include various data verification checks prior to execution of subroutines or instruction sets corresponding to the selected option. In one aspect, car identification information entered into the system, such as but not limited to alphanumeric keyboard input of the identification number provided on each tank car, may be advantageously compared to other data stored in the system associated with that car identification information. For example, information such as the date(s) of the last inspection(s), type(s) of last inspection(s), and/or date of arrival in the facility, may be referenced by the system to determine if a subsequently input request to perform a specified inspection has already been performed and is therefore unnecessary. The system may then alert the user, such as by visual or audible prompts which may include the references information, to the need for possible reconsideration of the user's selection.

An important aspect of the invention is inspection performed in accord with the invention is the GE HM-201 inspection activity in accord with option 1, described below. Following selection of this option by a user through an appropriate input device, the system prompts for input of the car status in step 405. In other words, the system requires instruction as to whether a selected tank car is to be upmarketed in step 410, released in step 610, or prepared for order in step 510 status.

The upmarket status of step 410, also called the upmarket requalification process, entails performance of (1) a structural integrity inspection inclusive of the exterior weld attachments and girth seam welds; (2) a service life shell thickness inspection; (3) a lining inspection, if lined; (4) a service equipment inspection; (5) a R-1 inspection, if required; (6) a R-2 inspection, if required; and (7) a SS-2 inspection. The upmarket status is assigned to a car when it is desired to perform a comprehensive requalification of a tank car that is destined for storage. Generally, cars are placed in upmarket status it the storage term is anticipated as lasting less than about a year. In other words, even though there is no customer to lease or purchase the tank car, the car is inspected and placed in a state of readiness so that it may be shipped to the customer directly from storage without the need to perform additional inspections. Even though no customer has been ascertained as of the inspection, the tank cars are qualified in accord with an assigned commodity or commodity type and stored pending receipt of an order by a customer for a tank car adapted and qualified to transport the assigned commodity. For example, a tank car has come off of lease to customer #1 and there is no known customer #2 to lease the tank car. It is anticipated that this type of tank car will be placed back in service within one year for a particular type of commodity transport, so the car is inspected in accord with the requalification process, noted above, applying criteria applicable to a selected commodity or commodity type. The car is then placed in storage until, several months later, an order is received by customer #2 for a tank car configured to transport the selected commodity. Since the car has already been inspected and qualified for transport of the selected commodity, the car can be delivered directly to the customer from storage without the need to perform additional inspection. Since the average wait time in a railroad car inspection facility is about 15; days, the customer receipt date is correspondingly accelerated.

The order status of step 510 is similar to the upmarket status, described above. The order status, however, applies to tank cars which undergo requalification subsequent to a customer's order for the tank car to transport a desired commodity. The order status requalification also entails performance of (1) a structural integrity inspection inclusive of the exterior weld attachments and girth seam welds; (2) a service life shell thickness inspection; (3) a lining inspection, if lined; (4) a service equipment inspection; (5) a R-1 inspection, if required; (6) a R-2 inspection, if required; and (7) a SS-2 inspection. One difference between the order status and the upmarket status is that the order status does not require input of the selected commodity or commodity type in conjunction with the entry of the shell thickness data, as does the upmarket status.

Finally, the release status of step 610 excludes the structural integrity and service equipment inspections and includes only (1) a service life shell thickness inspection and (2) a lining inspection, if lined. The release status is indicative of cars which have been released from service prior and are to be sent to storage for an indefinite period and are not selected for upmarket status.

Turning first to the upmarket requalification following selection of the upmarket status by a user in step 410 by appropriate input device, the system passes to print or output in step 415 the data input forms upon which inspection data is to be recorded during the upmarket requalification inspection. Step 415 may also include printing or outputting of inspection procedures, in accord with the detailed description of the aforementioned co-pending application, to accompany the data input forms.

Although step 410 refers to printing of forms, this aspect of the invention equally applies to outputting the forms and/or procedures to a hand-held display, such as conventionally available hand-held computing devices or personal data assistant (PDA) devices. The forms could be appropriately scaled to the display size, as applicable. For example, the system could sequentially display single lines of the procedure, each line representing an individual step to be performed by the user and followed by data entry to enable display and execution of the subsequent step. Alternately, the system could display a plurality of lines or steps of the procedure inclusive of, but not limited to, an entire page of a corresponding procedure printed on conventional 8.5"×11" paper. Although it is possible that the hand-held computing device or PDA (hereinafter simply PDA) may itself be the aforementioned computer system 100 or may comprise a node in a system of linked PDAs, it is preferred to use such PDA in an adjunct capacity to a centralized computer system 100. Prior to execution of the inspection procedure, computer system 100 accesses necessary data and programs for performance of one or more indicated inspections and outputs the data and/or programs, as required, to the PDA for execution thereon at a later time. Alternatively, the computer system 100 may communicate with the PDA during execution of the inspection procedure wherein the necessary data and programs are accessed by the computer system 100 and transmitted to the PDA by a suitable data transmission media, such as acoustic or light waves. This transmission may include, for example, substantially continuous transmission of data streams or transmission of data in packets or bursts. Similarly, inputs into the PDA by the user, such as inspection data, inspection information, or messages, may be output back to the computer system 100 through the same or a different transmission media either during the inspection or at a later time.

In accord with the above discussion, a user may select in step 415 a desired type of output of the inspection data input forms. If a hardcopy is desired, the computer system 100 will access all of the data fields required to be inspected during performance of the selected procedure and output the data fields in an organized format as shown, for example, in FIGS. 5–10, corresponding to the tank shell attachment weld defect report, tank shell girth weld defect report, ultrasonic service life shell thickness report, ultrasonic evidence of damage report, lining system defect report, and tank car requalification report, respectively. Although not shown in the Figures, it is preferred that the system additionally accesses data including, for example, the car marking, car owner, DOT specification, car builder, and stub sill design and imprint the information on the form(s) to clearly dedicate the form(s) to a specified tank car. The user would then take these form(s) or procedures and perform the required inspections in accord with the detailed instructions provided in the aforementioned co-pending application. Following performance of these procedures, the user or another person, would enter the inspection data into the computer system 100 in steps 425–470. Alternatively, as mentioned, the procedures, or steps thereof, may be output to a PDA, in which case steps 425–470 are performed as described below with respect to steps 425–470.

An example of the type of data stored by the computer system 100 in a computer readable medium is depicted in FIGS. 11a–11i, directed to a tank car weld inspection matrix. This matrix corresponds to tank car weld inspections performed in accord with the aforementioned co-pending application and associates, for a particular car builder and stub sill design, the exact number, type, and location of welds to be inspected. For example, if a user inputs to the computer system 100 a desire to perform an upmarket inspection on a RIC-WBR tank car, the computer system 100 could output an inspection form corresponding to FIG. 5 including at least all of the weld inspection types indicated by "YES" in the RIC-WBR column. Likewise, the computer system 100 preferably includes computer readable media containing additional databases or matrices storing and organizing all of the inspection information, inspection data, and other types of information described in the aforementioned co-pending application. For example, another database in accord with this aspect of the invention includes a listing of numerous types of tank car linings and commodity types which may be, in one aspect, incorporated into a printed form or displayed for the benefit of a user. In another aspect, computer system 100 may use this information, in conjunction with gathered inspection data, to compute a next inspection interval or to trend lining condition data for a specific tank car, lining condition for a specified lining, or even lining condition for a specified commodity, as generally described in the aforementioned co-pending application and as further described below. These databases are then singly or collectively accessed to provide either generic inspection forms, suitable for use in any inspection, wherein portions are omitted at the user's discretion, or specific inspection forms, wherein the user fills in the indicated fields.

As noted above, the following sequence of steps 425–470 are described in,accord with an aspect of the invention wherein a PDA or hand held computing device is used during performance of the inspection sequence. It is understood that the data entry discussed herein could also include the entry of data into the computer system 100 by a user inputting the data from an inspection form.

The structural integrity inspection step 420 is divided into two main aspects. First, the visual inspection of exterior weld attachments in step 425 and, second, the ultrasonic flaw inspection of girth weld seams in step 430. As one example, the visual inspection of exterior weld attachments would include, for an RIC-WBR tank car, an inspection of head brace pads, pad-to-tank pads, sill-to-pad, headbrace-to-sill, headbrace-to-pad, bolster-to-bolsterpad, BOV saddle-to-tank, sump-to-tank, BOV skid to tank, girth seam welds, draft sill welds, and miscellaneous transverse welds greater than about ¼", at least a portion of which is within 4 feet of the bottom centerline, as set forth in FIGS. 11a–11i and the aforementioned co-pending application. For each of these required inspection points, the PDA would display the component to be inspected (e.g., head brace pad) and a weld to be inspected. The display of the weld to be inspected may include any combination of the inspection point location, weld code, a weld code description, or pictorial representations of the weld locations, as shown for example, in FIGS. 12a–12h. It is also preferred to display a plurality of predetermined defect codes to assist the user in characterizing the inspected welds. For example, for the head brace pad welds, a preferred grouping of typical weld defects may include, but are not limited to, Pad Parent Metal (PPM), Weld Toe-to-Pad (WTP), Weld Toe-to-Headbrace(WTH), Tank Parent Metal (TPM), and other (OTH). Following visual inspection of each of the required exterior weld attachment inspection points, the user would input the inspection data into the PDA, where it is stored or output to the computer system 100.

To facilitate data entry, the system may advantageously present pull-down bars to the user, wherein the pull-down bars provide different selectable entries or information entries corresponding to different levels of an indicated feature. For example, all of the weld codes or location codes may be listed by weld code and weld description to permit the user greater flexibility in sequencing the welds inspected during the inspection procedure. Additionally,the system may be configured to permit a user to highlight, such as by a touch sensitive display, a desired category from a listing of defect categories to permit specification of desired information, such as defect type, approximate defect length, inspection technique, or any other category, for the convenience of the user.

Likewise, in step 430 the user would ultrasonically inspect each of the girth seam welds as described in detail in the aforementioned co-pending application and input the inspection results into the PDA, where it is stored or output to the computer system 100. It is preferred that the user enter additional data to characterize the inspection including, for example, the inspection date (which may default to the current date), the equipment used, the inspector's name and level of certification, the surface on which the inspection was conducted, the calibration sheet or log reference, the couplant manufacturer and type, the calibration block identification, the condition of the material surface, and special equipment used.

The service life shell thickness test is performed in step 435. As described in the co-pending application,this procedure includes taking a plurality of readings approximately 3 inches from either side of each circumferential weld in the various shell rings, the readings taken, for example, at 12 o'clock, 3 o'clock, 6 o'clock and 9 o'clock positions, as well as one measurement taken at the center of the heads. For example, the data entry fields may include a plurality of rings (e.g., rings 1–3), wherein an A-end and B-end measurement is input for each of the 3 o'clock, 6 o'clock, 9 o'clock, and 12 o'clock positions. Shell thickness readings are also obtained for local openings and are input in the PDA with corresponding location data, such as whether the defect is disposed toward the A-end side of the opening or the B-end side. This data, as well as other inspection data obtained in accord with the procedures described in the co-pending application, are input into the PDA to properly characterize the obtained inspection data, where it is stored or output to the computer system 100. In a preferred aspect, upon input into the PDA or computer system 100 of shell thickness measurement which is lower than a minimum acceptable shell thickness, a shell thickness warning is displayed and the user may, for example, re-enter the data, if in error, or elect to designate the car for repair and terminate the inspection. Additional data may be entered as noted above, such as but not limited to the surface on which the inspection was conducted, the calibration sheet or log reference, calibration block identification, etc. Notably, the upmarket requalification process requires input or assignment of the commodity type to be used with the tank car in subsequent service. Although the commodity type may be input at any time, it may also be conveniently input concurrent with entry of the shell thickness data.

If there is evidence of damage on the car noted during the inspection, the existence of such damage, such as denoted by a "Y" or "yes" entry, is input into the PDA (or computer system 100) in step 440, whereupon the PDA prompts for input of detailed damage information in step 445. In one aspect, this may including displaying a listing of damage locations, such as the heads (A-end or B-end), shell (e.g., ring 1, ring 2, ring 3, ring 4, etc), manway 1, unload nozzle 1, safety valve nozzle 1, sump 1, or other locations, from which the user is prompted to make a selection. This damage location may include reference to a linear dimension measured from an arbitrary,reference point, such as the distance from the defect to the nearest circumferential butt weld, and may also include reference to "clock" or angular positions (where the 12 o'clock position corresponds to a top position) to accurately specify the defect location. Following selection or entry of the damage location, the PDA prompts for entry of the type of damage, such as general damage, local damage, or mechanical damage. The system also prompts for entry of the cause of damage, such as bathtub ring like corrosion, general corrosion, grouped pit corrosion, random pit corrosion, mechanical-gauge damage, or mechanical damage such as hammer marks. If the damage is pitting or pits, the system will prompt for entry of the diameter and number of pits, the location and other identifying information previously entered as noted above. This aspect of the invention further includes prompting for entry of data on the depth of the pits. Further, the inspection preferably requests input of the lowest measured shell thickness for the inside diameter or outside diameter, respectively.

In Step 450, the user is prompted to enter, such as by a "Y" or "N", whether the tank car has a lining or coating. If the car does possess a lining or coating, a lining and coating inspection is performed in accord with the procedures described in the aforementioned co-pending application. It is preferred, at the start, to display the lining information, such as the lining system (e.g., Farbo-coat 47, Firestone, Freight Line 410, etc), BSV lining material (e.g., electroless plating, glass, lead lined, rubber, etc), lining shop code, lining date, and specified lining inspection plan (if any). The user may determine whether or not this information is correct prior to proceeding with the inspection and may be afforded an opportunity to correct the data, if necessary. Following verification of the lining information, the PDA or computer system 100 displays lining and coating information including, for example, the car marks, DOT number, purpose of lining (e.g., corrosive or product purity), lining class and product name, shop name, lining age in years, theoretical remaining age in years, and "extended" lining age or cycle (ELC) representing the product of the theoretical lining age and a life cycle multiplier (LCM) based on the chemical resistance rating of the lining divided by the corrosive rating of the commodity. Thus, an ELC of 4% would represent a lining wherein only approximately 4% of its useful life has elapsed.

In this aspect of the invention, utilizing the PDA to input data during performance of the inspection, the PDA prompts the user to enter inspection data corresponding to observed defects falling within at least one of a plurality of prescribed liner defect conditions, such as a blister, crack, corrosion, or other defect type, as generally discussed in the lining inspection procedure provided in the aforementioned co-pending application. The defect conditions are divided into a plurality of models illustrative of varying degrees of severity of each of the liner defect conditions. Generally, as depicted in FIG. 13, high numbers (e.g., No. 8) indicate a lesser defect condition and higher numbers (e.g., No. 2) indicate a more severe defect condition. The data entry prompt may include, for example, one or more pop-up windows containing a plurality of selectable models. These models may be textual, describing the severities of the defect condition, such as large blistering, medium blistering, small blistering, and the smallest blistering seen by eye or they may be graphical models, displaying pictorial representations or pictures of the various severities of the defect condition. A combination of graphical and textual model information display is within the scope of the invention. In accord with the liner inspection procedure, data is also entered corresponding to the blister type and density, blister repair disposition, blister location, number of areas of blisters, cracks, crack type and density, crack repair disposition, crack location, crack number of areas, corrosion condition, corrosion repair disposition, corrosion location, corrosion number of areas, discoloration square footage and number of areas data, and dry film thickness readings (wherein the user may enter an average reading, lowest reading, and highest reading for the dry film thickness or may opt to let the computing device compute these figures. Following entry of the, inspection results, the system may prompt the user to assign a lining condition code, as shown in FIG. 13, based on the observed combination of defect conditions, or the system may itself assign a lining condition code to the lining based on the input combination of defect conditions in accord with the same table shown in FIG. 13, both in accord with the procedures described in the aforementioned co-pending application.

In this step, the system also prompts the user to enter a delamination or pin hole conditions, if observed. This prompt may include, for example, a pop-up menu or window including a plurality of selectable delamination and/or pinhole conditions or may include data entry fields where the user may enter the data directly. The selectable delamination conditions may include, upon user's making two cuts in the coating (to the substrate) about 1½" long to form an X, applying pressure sensitive tape over the cut, and removing the tape rapidly following setting of the adhesive, no evidence of peeling or removal (5A), trace peeling or removal along the incisions (4A), up to 0.625 inch jagged removal along most of either incision (3A), up to 0.125 inch jagged removal along most of either incision (2A), removal of most of the area of "X" under the tape (1A), or removal beyond the area of the "X" (0A). Further, the system may prompt for other information, such as whether the peeling is topcoat detachment, intercoat detachment, or detachment from the bare steel. The selectable pin hole conditions, in other words areas of the coated surface that have pinholes permeating to the substrate, may include holiday free (no ring outs), near holiday free (3 rings per 10 sq. ft.), and porous (in excess of 3 rings per 10 sq. ft.), such conditions occurring within an inspected area of about 10 square feet as determined by, for example, a Tinker Razor tester. The system, as with other inspection data, additionally prompts, at a minimum, for entry of the location of the areas of damage.

In view of the above, it is noted that the theoretical life of each lining is based on it's use with an appropriate commodity, as shown for example in FIG. 15. The estimated life is based on immersion of the lining in the most aggressive chemicals considered acceptable for use with the lining and thus represent a lower end of the life expectancy. Although lining materials may be used for wide varieties of commodities, they are generally better suited for particular types or families of commodities than they are for other types of commodities. For example, (unmodified) high bake phenolic (400° F.) is resistant against most solvents and concentrated acids, but is less suitable for strong alkalis, whereas (modified) high bake phenolic (400° F.) has good resistance against strong alkalis, but not against strong acids. Similarly, salt is known to be very corrosive to steel, but it is not particularly aggressive toward coatings. Thus, the life cycle of the lining, and the requalification date, may vary significantly depending of the actual commodity carried.

Subsequently, in step 460, the system or PDA prompts the user to enter service equipment inspection data. An initial screen of the service equipment inspection form preferably includes data entry fields for all of the inspections required of and specified in the aforementioned co-pending application, incorporated by reference. This display would include, for example, the inspector date, inspector name, reporting marks and car number, tank specification, stenciled specification, tank capacity (e.g., in gallons or pounds of fluid), tank test pressure in psi or KPa, and presence or absence of heating coils. Additionally, with regard to the safety valves, if present, the display preferably prompts for entry of the name and location of the company testing the valve; the manufacturer, model number, and type of valve; serial number of valve; start-to-discharge pressure (STD) in psi or Kpa; vapor-tight pressure in psi or KPa, and whether the valve seals were replaced, including the new seal material. The data entry in the above step may be facilitated by any combination of pull-down menu or popup screen, as desired. For example, the system may, upon entry by the user of valve seal replacement, prompt the user to select a seal material from a displayed list of materials provided in a pop-up window including materials such as butyl, epichlorohydrin, EPDM, flurosilicone, neoprene, or nitrile. Similar fields may also be displayed for entry of data corresponding to additional safety valves or combination valves, the latter further requiring entry of the breaking pin lower diaphragm pressure in psi/KPa and the frangible disc pressure in psi/KPa. Further, this step includes prompting for, and entry of, the number of vents for the car and the vents frangible disc pressure thereof in psi/KPa. This step also includes input by the user that the excess flow check valve was checked and found to properly seat.

Upon completion of the above inspections, a process checklist is generated by the system in step 465. A visual indication is provided to the user to document the user's completion of required portions of the inspection, the indication inclusive of, for example, text messages and/or graphical indicators, such as check marks, indicating completed or incomplete portions of the required procedure. If any portions of the inspection are incomplete, the system appropriately provides a warning to the user to obtain and input the missing inspection data.

If the user is unable at that time to complete the remaining portions of the inspection, the system provides the user in step 470 with an option of temporarily storing the inspection data for completion at a later time. Step 470 alternatively provides the user with an option of uploading the inspection data from the PDA to the computer system 100 if the data was originally input into a PDA or an option of storing the information if originally input into the computer system 100 directly. In either case, the information is temporarily stored in a computer readable medium. Following input of the inspection data into computer system 100, whether by transfer of the inspection data electronically from a computer readable medium or by user data entry from hardcopy inspection forms, which may be advantageously facilitated by conversion of the forms into electronic data by scanning the forms using a scanner and converting the forms into computer usable data by utilization of image recognition software, control passes, in one path, to step 492 where the shell thickness and commodity corrosiveness are used to calculate the requalification interval and control passes, in a second path, to step 475 where the requalification status is updated to reflect completion of the upmarket inspection and the upmarket status is arbitrarily assigned a code value of 2. Step 480 demarks sending the tank car to storage where it waits for a customer or EM to select the tank car for use in step 482. As noted above, the upmarket requalification assigns a commodity to the tank car prior to or concurrent with performance of the inspection, such as when entering shell thickness data in step 435. Thus, the computer system essentially bypasses step 484, as the commodity for the new order has already been assigned to the tank car and the tank car is selected for that particular service by the EM.

Step 486 ("Process II") optionally facilitates selection of the specific tank car by the EM. Specially, Process II provides a searchable database of at least all cars having the upmarket status (i.e., those cars available for immediate delivery). Thus, an EM may search or shop this database to find, for example, all tank cars requalified to transport a given commodity and may further opt to elect a specific tank car that exhibits any feature or combination of features desirable to that EM, such as an excellent lining condition or highly conservative shell thickness values.

In step 488, the system accesses tank car data stored on computer readable media to determine whether the selected tank car is lined and whether the assigned commodity is corrosive. If the assigned commodity is corrosive, the system determines in step 494 whether the customer or EM has their own lining inspection plan and if no data is available, it is preferred that the system alert the user to this status and prompt the user to view the available tank car and EM data in step 496 to verify correct assignment of this status. If, for example, the customer desires lining inspection steps not required by the GE HM-201 inspection, the additional steps may then be performed prior to release of the car and update of the requalification status to order, noted below.

As noted above, the shell thickness and commodity corrosiveness are used to calculate the requalification interval in step 492. The inspection interval or requalification interval is calculated, in a preferred form, by subtracting the minimum shell thickness value measured during the inspection ($T_{min}$) from the minimum required shell thickness for the tank car ($T_{req}$) and dividing the result by the corrosion rate for the commodity. $T_{req}$ is a variable number which differs for different classes of tank cars, damage types, and even damage locations, as shown generally in FIG. 14. In one aspect of the invention, the system assigns a next requalification date in accord with the lesser of the calculated requalification date and ten years from the base inspection date. For example, if the inspection was performed Jan. 1, 2000, and the calculated inspection interval for the assigned commodity of vegetable oil is 15 years, a 10 year inspection interval is assigned and the requalification date is set for Jan. 1, 2010. Other formulas and factors may be used in tandem with or in lieu of the above formula and the determination of there qualification date in accord with the invention is not limited by the particular form of requalification date calculation.

In step 498, the system determines whether the requalification status is upmarket (code value 2) or release (code value 3). As shown, if the tank car has an upmarket requalification status, control passes to step 588, wherein the databases of the computer system 100 are updated by storing the tank car inspection data thereon or therein. The requalification status is updated to reflect the order status and a code value of 1 is assigned to the tank car. The system outputs requalification forms or reports in step 592, typically including a shell attachment weld defect report, ultrasonic girth seam weld defect report, ultrasonic shell thickness inspection report, lining system defect report, and final checklist report. In other words, all of the pertinent data fields in the substantially blank forms depicted in FIGS. 5–10 are matched to the appropriate inspection data and printed or electronically output locally or remotely. The car may then be shipped to the customer in step 594.

Turning to the selection of release car status by a user in step 405, the release car process mirrors the upmarket requalification process, but excludes the structural integrity inspections (steps 420–430) and service equipment inspection (step 460). The release status inspection requires, therefore, completion of the service life shell thickness inspection in step 620 and evidence of damage in steps 625 and 640, if required, as well as the lining inspection in step 645 if the tank car is lined, as determined in step 630. The details of these inspections and discussed above with respect to the complete GE HM-201 inspection and are not repeated herein.

Following completion of the release car inspection using, for example, the hand-held computing device having a display, the hand-held computing device or system provides the user in step 650 with an option of temporarily storing the inspection data for completion at a later time or an option of outputting the inspection data from the computing device to the computer system 100. In either case, the information is temporarily stored in a computer readable medium. Following input of the inspection data into computer system 100, whether by transfer of the inspection data electronically from a computer readable medium or by user data entry from hardcopy inspection forms, the system updates the requalification status to reflect completion of the release car requalification inspection and the requalification status is arbitrarily assigned a code value of 3. The tank car is then sent to storage until it is selected for use by a customer of EM in step 482. The commodity type is specified by the customer in step 484, unlike the upmarket requalification, wherein the commodity type is pre-assigned.

Based upon the lining status and corrosiveness of the selected commodity determined by the system in steps 488 and 490 by accessing appropriate tank car data stored on computer readable media, and the requalification interval is calculated in step 492, as discussed above. If the assigned commodity is corrosive, the system also determines in step 494 whether the customer or EM has their own lining inspection plan and if no data is available, it is preferred that the system alert the user to this status and prompt the user to view the available tank car and EM data in step 496 to verify correct assignment of this status and take appropriate action as necessary.

In step 498, the system determines whether the requalification status is upmarket (code value 2) or release (code value 3). As shown, if the tank car has a release car status, control passes to icon "A" which flows to step 510. In other words, since the release status is assigned to tank cars destined to be sent to storage for an indefinite period since it is not anticipated that the cars will be placed in service in the near term, an exhaustive inspection in accord with GE HM-201 will not be performed. For example, it is not cost-effective to perform the full GE HM-201 inspection prior to long-term storage since some aspects of the tank car condition will gradually deteriorate over time in storage, which would necessitate a GE HM-201 inspection upon release from storage.

In step 510, performance of the order car inspection process is indicated by user selection in step 405 or by initiation of the system in 498. In step 515, if the requalification status is "other" indicating selection of order status in step 405, the system prints or outputs inspection data input forms including the shell attachment weld defect report, ultrasonic girth seam weld defect report, ultrasonic shell thickness inspection report, lining system defect report, and checklist report, as shown generally in FIGS. 5–10. As noted in the description of the upmarket requalification above, this step may include printing or outputting of inspection procedures, in accord with the detailed description of the aforementioned co-pending application, to accompany the data input forms. Additionally, this step may include printing of "hardcopy" forms for subsequent data input by a user and may include outputting the forms and/or procedures to a hand-held computing device having a display operating, for example, in an adjunct capacity to a centralized computer system 100.

In step 525, on the other hand, the service life shell thickness and lining inspection data input forms are not output or printed, since these inspections were previously performed and the inspection data obtained thereby are considered valid as these parameters are not expected to change during storage and are not to be re-inspected.

Initially, both the release car status tank car and the order status tank car are subjected to a structural integrity inspection in steps 530, 535, and 540, as described in accord with steps 420–430 and performed in accord with the aforementioned co-pending application. In step 545, the system checks the requalification status. If the status is "other", indicating an order car status, the system passes to the service life shell thickness inspection in step 550, where the user performs the service life shell thickness inspection in accord with steps 435. Similarly, in addition to input of the inspection data obtained in step 550 into the hand-held computing device or paper forms, for example, evidence of damage is determined in step 560 and is recorded or input in step 555, as described above with respect to steps 440 and 445. If the system, or user, determines that the tank car possesses a lining in step 570, it is subsequently determined whether the commodity information from the existing order is corrosive in step 572. Although not shown in FIG. 4, the system determines, in this step or in another step subsequent thereto, whether the tank car is lined and whether the commodity is corrosive, similar to steps 488 and 490, and calculates the requalification interval as discussed with respect to step 492.

In the aspect of the invention depicted in FIG. 4, a GE HM-201 lining inspection in accord with step 455, for example, and the methods of the aforementioned co-pending application is performed in steps 574 or 576. In other words, this lining inspection is performed in addition to any other lining inspection plan requested by the customer, which is performed in step 580 corresponding to steps 494 and 496 discussed above. Performing the GE HM-201 lining inspection in all instances permits accelerated development of a lining inspection database, facilitating trending of lining inspection data on a tank car, lining type, and/or fleet basis, for example.

In step 584, a service equipment inspection is performed on both order car status and release car status tank cars, as discussed above with respect to the upmarket requalification inspection and as detailed in the complete GE HM-201 inspection described in the aforementioned co-pending application and, accordingly, is not repeated herein.

Upon completion of the above inspections, a process checklist is generated by the system in step 586 including display to the user of completed portions of the inspection by means such as text messages and/or graphical indicators. In step 588, the user updates the system database such as by outputting the inspection data from the hand-held computing device to the system 100 or by direct input of the inspection data from hard copy inspection report forms. Following updating of the database in step 588, the update requalification status is set to order car code value 1 and the system outputs requalification forms or reports in step 592. As noted above, these forms include, for example, a shell attachment weld defect report, ultrasonic girth seam weld defect report, ultrasonic shell thickness inspection report, lining system defect report, and final checklist report. In this step, the system matches the data fields depicted in FIGS. 5–10 with appropriate inspection data and prints or electronically outputs the completed locally or remotely. The car may then be shipped to the customer in step 594.

While the invention has been described with reference to only a few facets thereof, it is submitted that, when in possession of the documentation which is contained in the Appendices of this application, and given the guidance/knowledge of the preceding disclosure, that a person of skill in the art to which the instant invention pertains, would be fully enabled and would be able to implement and practice the claimed invention without difficulty.

What is claimed is:

1. A method of requalifying a tank car adapted to transport commodities, comprising the steps of:
    inspecting the tank car in accord with a selected instruction set comprising a pre-determined plurality of inspection steps;
    inputting inspection data obtained from execution of said inspection steps into a computer-readable storage medium;
    relating, using a computer having at least one processor, the inspection data to secondary data comprising at least one of ownership data, lease status data, rental status data, and transported commodity data;
    computing, using said computer, a requalification date for the tank car based on the input inspection data and the secondary data; and
    outputting a signal indicative of the requalification date.

2. A method of requalifying a tank car adapted to transport commodities in accord with claim 1, wherein said outputting step comprises outputting the signal to at least one of a network link, a local network, a server, a computer-readable storage medium, a display device, a physical print media, and a device configured to imprint the requalification date on outer surface of the tank car.

3. A method of requalifying a tank car adapted to transport commodities in accord with claim 2, wherein the computing step further comprises:
    determining a car lining status from the inspection data;
    determining a corrosive service status from the secondary data;
    assigning, for lined cars, a requalification date determined based on the inspection data and the secondary data.

4. A method of requalifying a tank car adapted to transport commodities comprising the steps of:
    inspecting the tank car in accord with a selected instruction set comprising a pre-determined plurality of inspection steps:
    inputting inspection data obtained from execution of said inspection steps into a computer-readable storage medium;
    relating, using a computer having at least one processor, the inspection data to secondary data comprising at least one of ownership data, lease status data, rental status data, and transported commodity data;
    computing, using said computer, a requalification date for the tank car based on the input inspection data and the secondary data; and
    outputting a signal indicative of the requalification date, wherein the computing step further comprises:
    determining a car lining status from the inspection data;
    determining a corrosive service status from the secondary data; and
    calculating an estimated requalification date, for unlined cars used in non-corrosive service, by subtracting a lowest shell thickness reading from the inspection data from a minimum required shell thickness and dividing the result by a commodity corrosion rate included in the transported commodity data;
    assigning a requalification date in accord with the lesser of said estimated requalification date and ten years from a base inspection date, and
    wherein said outputting step comprises outputting the signal to at least one of a network link, a local network, a server, a computer-readable storage medium, a display device, a physical print media, and a device configured to imprint the requalification date on outer surface of the tank car.

5. A method of requalifying a tank car adapted to transport commodities in accord with claim 4, wherein said inspecting step comprises:
    assigning one of a upmarket requalification status, release car status, and order car status to the inspected tank car, and
    inspecting the tank car in accord with a selected one of a plurality of procedures corresponding to one of a requalification upmarket inspection, release car inspection, and order car inspection.

6. A method of requalifying a tank car adapted to transport commodities comprising the steps of:
    inspecting the tank car in accord with a selected instruction set comprising a pre-determined plurality of inspection steps;
    inputting inspection data obtained from execution of said inspection steps into a computer-readable storage medium;
    relating, using a computer having at least one processor, the inspection data to secondary data comprising at least one of ownership data, lease status data, rental status data, and transported commodity data;
    computing, using said computer, a requalification date for the tank car based on the input inspection data and the secondary data; and
    outputting a signal indicative of the requalification date,
    wherein said outputting step comprises outputting the signal to at least one of a network link, a local network, a server, a computer-readable storage medium, a display device, a physical print media, and a device configured to imprint the requalification date on outer surface of the tank car,
    wherein the computing step further comprises:
        determining a car lining status from the inspection data;
        determining a corrosive service status from the secondary data;
        assigning, for lined cars, a requalification date determined based on the inspection data and the secondary data
    wherein said inspecting step comprises:
        assigning one of a requalification upmarket status, release car status, and order car status to the inspected tank car, and
        inspecting the tank car in accord with a selected one of a plurality of procedures corresponding to one of a requalification upmarket inspection, release car inspection, and order car inspection.

7. A method of requalifying a tank car adapted to transport commodities in accord with claim 5, wherein said inspecting step comprises:
    inspecting of a plurality of inspection sites selected from at least one area required to be inspected under at least one of 49 C.F.R. §180.509, SSIP, and Rule 88.B.2.

8. A test procedure for inspecting a vehicle adapted to transport commodities, comprising the steps of:
    compiling inspection data in accord with a predetermined exhaustive list of features set forth in at least one instruction set;
    inputting the inspection data into a computer readable medium;
    selecting, using a computer, a lowest dimensional data value for a selected feature from the input data;
    selecting, using the computer, a corresponding minimum permissible value for the selected feature;

computing, using the computer, a difference between the minimum permissible value and the lowest measured data value corresponding to the minimum permissible value;

dividing, using the computer, said difference with a third value indicative of a selected form of deterioration over time to derive a date at which the vehicle should be subjected to reinspection and requalification; and outputting a signal indicative of the computed requalification date from the computer.

9. A test procedure for inspecting a vehicle adapted to transport commodities in accord with claim 8, wherein said outputting step comprises outputting the signal to at least one of a network link, a local network, a server, a computer-readable storage medium, a display device, and a physical print media inclusive of an outer surface of the tank car.

10. A test procedure for inspecting a vehicle adapted to transport commodities in accord with claim 9, wherein said lowest measured data value and said corresponding minimum permissible value are shell thickness values.

11. A test procedure for inspecting a vehicle adapted to transport commodities in accord with claim 10, wherein said third value indicative of a selected form of deterioration over time is a corrosion rate.

12. A test procedure for inspecting a vehicle adapted to transport commodities in accord with claim 11, wherein the corrosion rate is related to a particular pairing of a transported commodity and a lining type.

13. A test procedure for inspecting a vehicle adapted to transport commodities in accord with claim 11, wherein said compiling step comprises inspection of a plurality of inspection sites selected from at least one area required to be inspected under at least one of 49 C.F.R. §180.509, SSIP, and Rule 88.B.2.

14. A computer-readable medium bearing instructions enabling a computer having at least one processor to determine a requalification date of a tank car adapted to transport commodities, the instructions, when executed by a computer, causing the computer to carry out the steps of:

determining a type of vehicle under inspection;

selecting from an instruction set an exhaustive list of sites to be inspected for the identified type of vehicle;

outputting to a user each listed site in accord with the instruction set forth for each of the listed sites in the instruction set;

storing data derived from implementation of the inspection instruction set for each of said exhaustive list of sites input into the computer-readable medium by the user;

accessing from the same or another computer-readable medium a first record comprising inspection data;

accessing from the same or another computer-readable medium a second record comprising commodity data;

determining a requalification date for the tank car based on the first record and the second record.

15. A computer-readable medium bearing instructions in accord with claim 14, wherein said first record is a shell thickness value.

16. A computer-readable medium bearing instructions in accord with claim 15, wherein said first record is a minimum measured shell thickness value.

17. A computer-readable medium bearing instructions in accord with claim 16, wherein said second record is a commodity corrosion rate.

18. A computer-readable medium bearing instructions in accord with claim 17, wherein said determining a requalification date comprises the steps of:

accessing a third record from a database comprising minimum allowable shell thicknesses;

calculating a difference between the minimum allowable shell thickness of the third record and the minimum measured shell thickness value of the first record; and dividing the difference by a commodity corrosion rate of the second record.

19. A computer-readable medium bearing instructions in accord with claim 18, wherein said commodity corrosion rate is adjusted in accord with a lining type.

20. A computer-readable medium bearing instructions in accord with claim 14, further comprising:

trending inspection data; and establishing, based on the trended inspection data, a maintenance or inspection interval.

* * * * *